United States Patent
Hayashi et al.

(10) Patent No.: US 6,629,636 B1
(45) Date of Patent: Oct. 7, 2003

(54) SALES TRANSACTION TERMINAL DEVICE

(75) Inventors: Kiyotsugu Hayashi, Osaka (JP); Ichiro Arai, Yokohama (JP); Teruo Kato, Yokohama (JP); Akira Nakajima, Tokyo (JP); Kanji Muto, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 435 days.

(21) Appl. No.: 09/624,768

(22) Filed: Jul. 25, 2000

(30) Foreign Application Priority Data

Dec. 20, 1999 (JP) .............................. 11-361017

(51) Int. Cl.[7] .............................................. G06F 17/60
(52) U.S. Cl. ...................................... 235/383; 235/379
(58) Field of Search ................................. 235/375, 380, 235/383, 379

(56) References Cited

U.S. PATENT DOCUMENTS

| | | | | |
|---|---|---|---|---|
| 4,617,457 A | * | 10/1986 | Granzow et al. | ............ 235/379 |
| 4,797,540 A | * | 1/1989 | Kimizu | ........................ 235/383 |
| 5,267,149 A | * | 11/1993 | Anada et al. | .................. 705/44 |
| 5,412,193 A | * | 5/1995 | Swartz et al. | ................ 235/383 |
| 5,886,336 A | * | 3/1999 | Tang et al. | ............ 235/462.43 |
| 6,003,008 A | * | 12/1999 | Postrel et al. | .................. 705/4 |
| 6,354,498 B1 | * | 3/2002 | Lutz | ............................. 235/385 |
| 6,409,081 B1 | * | 6/2002 | Nugent, Jr. | ................ 235/383 |

* cited by examiner

Primary Examiner—Karl D. Frech
(74) Attorney, Agent, or Firm—Connolly Bove Lodge & Hutz LLP

(57) ABSTRACT

A sales transaction terminal device includes an L-shaped terminal body 101 with an exhibition spot 122 opened to the customer side so that customers can take a look at a commodity sample 123 on a commodity table 101a. A body 203 of an operator display unit 204 is rotatably supported about a shaft 202 which is provided at an upper part of the operator side of the L-shaped terminal body 101. This arrangement makes it possible to optimize the angle of the operator display unit 204 according to the eye position of each operator.

35 Claims, 35 Drawing Sheets

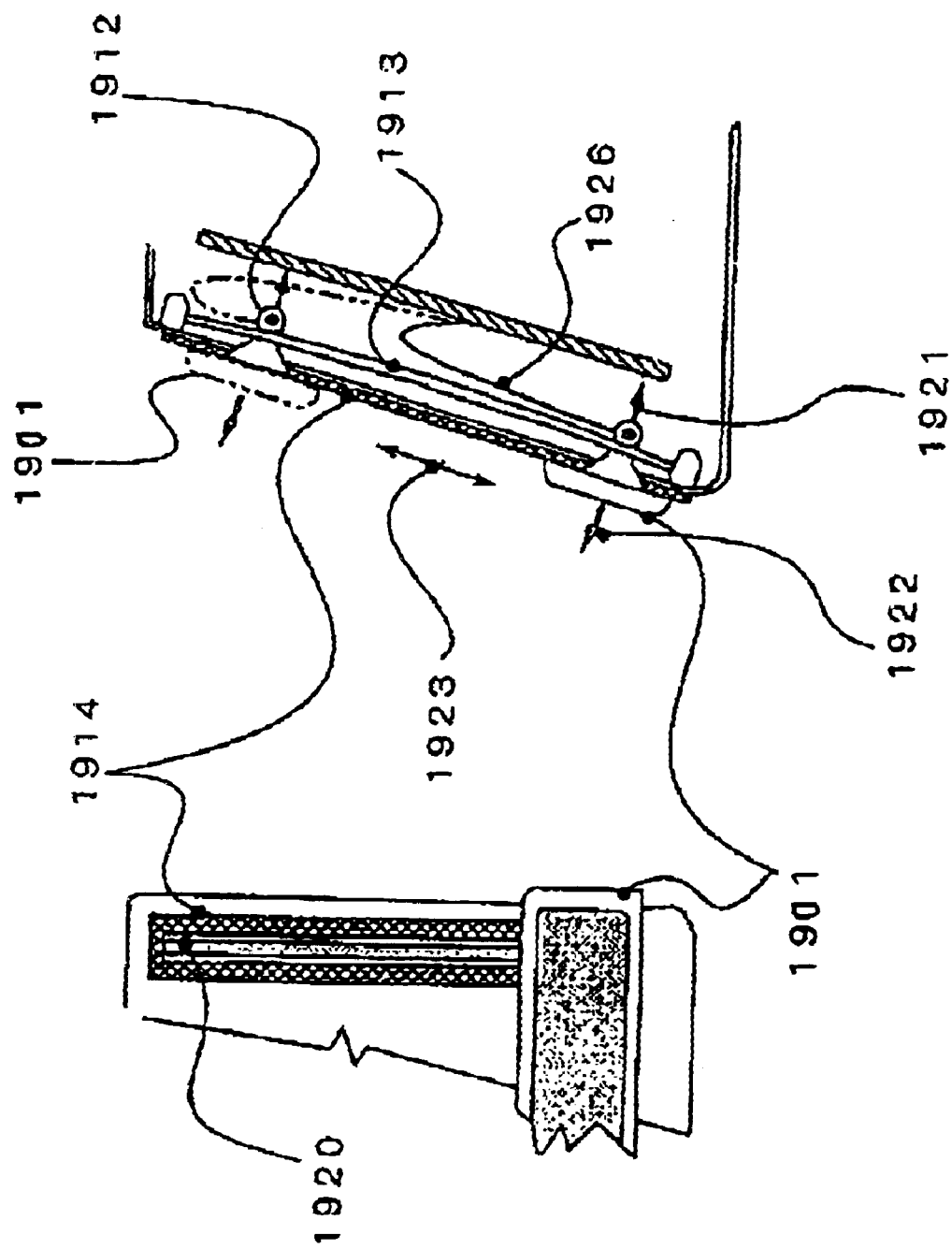

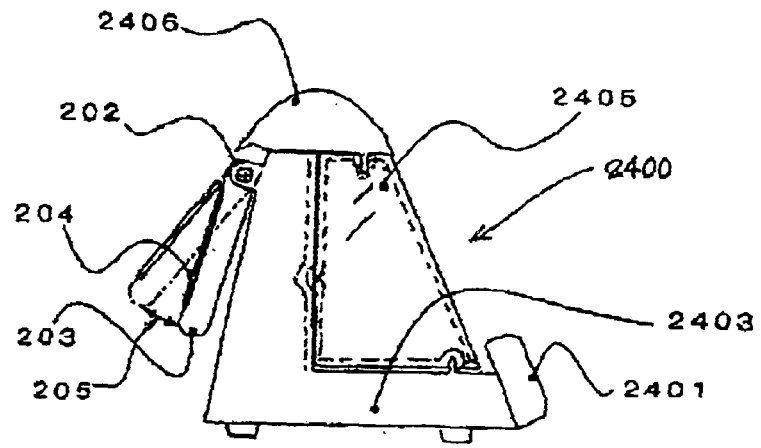
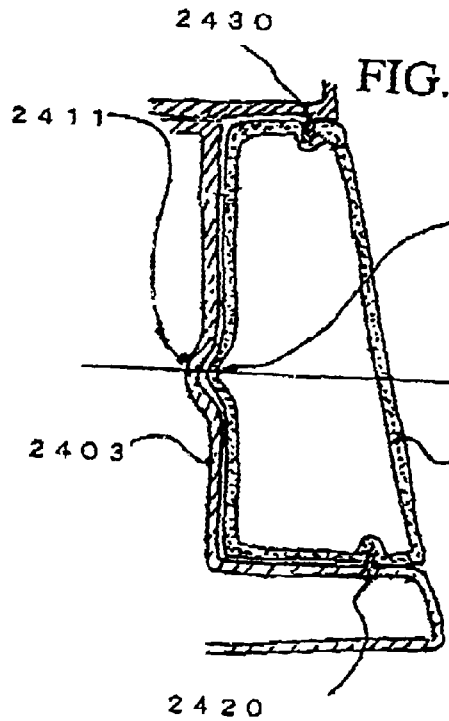
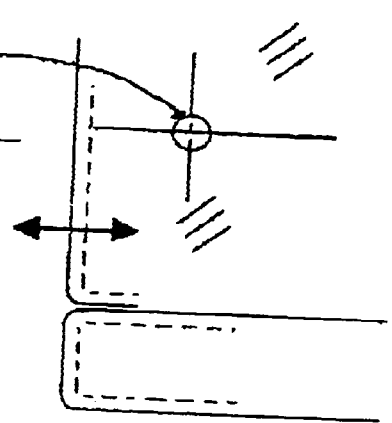
FIG. 37A
FIG. 37B
FIG. 37C

SALES TRANSACTION TERMINAL DEVICE

BACKGROUND OF THE INVENTION

The present invention relates to a sales transaction terminal device which is preferably used on a shop counter.

FIG. 53 shows a conventional sales transaction terminal device 5000 which includes a terminal body 5001 and a display body 5002. The display body 5002, serving as a support body for an operator display unit 5003, is rotatable about a shaft 5004 provided on the terminal body 5001. An operator opens the display body 5002 by pulling it up. The display body 5002 is stationarily held at a predetermined angle. The operator performs an ordinary sales transaction by manipulating a touch panel on the operator display unit 5003, while looking at money amount data in a display screen 5006.

A magnetic card reader 5005 is provided at the operator side of the terminal body 5001 to check ID (i.e., identification) of the operator.

SUMMARY OF THE INVENTION

An object of the present invention is to improve usability of this kind of sales transaction terminal device by effectively utilizing a dead space thereof for various purposes.

Another object of the present invention is to provide a novel sales transaction terminal device capable of providing an attractive exhibition spot.

Another object of the present invention is to provide a novel sales transaction terminal device capable of providing various kinds of customer services.

Another object of the present invention is to provide a novel sales transaction terminal device capable of improving operability in an operator's sales transaction.

Another object of the present invention is to provide a novel sales transaction terminal device capable of improving a customer's ordering procedure.

Another object of the present invention is to provide a novel sales transaction terminal device capable of providing a compact, separable, or foldable arrangement.

Another object of the present invention is to provide a novel sales transaction terminal device capable of providing a new type of customer services.

Another object of the present invention is to provide a novel sales transaction terminal device capable of improving security of an operator performing the sales transaction in a shop counter.

In order to accomplish the above and other related objects, the present invention provides a sales transaction terminal device comprising a terminal body having a recessed configuration when seen from its side. The terminal body has an exhibition spot opened to a customer side thereof, with a side view of the exhibition spot corresponding to the recessed configuration. And, an operator display unit is provided at an operator side of the terminal body for allowing an operator to perform a sales transaction when a customer places an order at a shop counter where the sales transaction terminal device is placed.

According to later-described embodiments of the present invention, it is preferable that the operator display unit is rotatably hinged about a shaft provided at the operator side of the terminal body so that an angle of the operator display unit is adjustable.

According to the embodiments of the present invention, it is preferable that a cover casing is provided to cover the exhibition spot, and the cover casing is transparent at a portion facing to the customer.

According to the embodiments of the present invention, it is preferable that the terminal body is an L-shaped terminal body comprising a horizontal portion and a vertical portion which cooperatively constitute an L-shaped configuration. The horizontal portion has a top surface serving as a commodity table and the vertical portion has a wall cooperating with the top surface of the horizontal portion to form the exhibition spot. The vertical portion is rotatable about a shaft of a hinge provided at a corner of the horizontal portion and the vertical portion. A lock member is provided for fixing the vertical portion to the horizontal portion so that the vertical portion is held in a standing position. And, the vertical portion is foldable about the shaft of the hinge and lies on the horizontal portion when the lock member is unlocked.

According to the embodiments of the present invention, it is preferable that the terminal body is an L-shaped terminal body comprising a horizontal portion and a vertical portion which cooperatively constitute an L-shaped configuration. The horizontal portion has a top surface serving as a commodity table, and the vertical portion has a wall cooperating with the top surface of the horizontal portion to form the exhibition spot. And, the vertical portion is detachable from the horizontal portion so as to be hung on a wall.

According to the embodiments of the present invention, it is preferable that the terminal body is an L-shaped terminal body comprising a platelike horizontal portion and a vertical portion which cooperatively constitute an L-shaped configuration. The platelike horizontal portion has a top surface serving as a commodity table, and the vertical portion has a wall cooperating with the top surface of the platelike horizontal portion to form the exhibition spot. The platelike horizontal portion is foldable about a hinge member provided between the horizontal portion and the vertical portion, so that the sales transaction terminal device can be used in a first position where the platelike horizontal portion is unfolded about the hinge member to place the sales transaction terminal device on a horizontal surface with the vertical portion being held at a standing position, and can be used in a second position where the platelike horizontal portion is folded about the hinge member to hang the sales transaction terminal device on a wall.

According to the embodiments of the present invention, it is preferable that the terminal body is an L-shaped terminal body comprising a plurality of casings which cooperatively surround a frame body on which a circuit board is installable, and the operator display unit is rotatably provided at the operator side of the terminal body.

According to the embodiments of the present invention, it is preferable that the terminal body is an L-shaped terminal body comprising a standing portion supporting the operator display unit and a base portion supporting the standing portion so as to form at least part of the exhibition spot of the terminal body.

According to the embodiments of the present invention, it is preferable that a roof is provided on a top of the terminal body.

According to the embodiments of the present invention, it is preferable that the terminal body has a lying U-shaped configuration when seen from its side. The lying U-shaped terminal body has an exhibition spot opened to a customer side thereof, with a side view of the exhibition spot corresponding to the lying U-shaped configuration. And, the operator display unit is provided at an operator side of the lying U-shaped terminal body for allowing an operator to perform a sales transaction when a customer places an order at a shop counter where the sales transaction terminal device is placed.

According to the embodiments of the present invention, it is preferable that a media card reader is provided at the operator side of the terminal body at a portion where the media card reader does not interfere with the operator display unit.

According to the embodiments of the present invention, it is preferable that the media card reader is slidable in a back-and-forth direction in response to an angular adjustment of the operator display unit.

According to the embodiments of the present invention, it is preferable that the media card reader is equipped with a wireless communication device so that the position of the media card reader can be flexibly changeable.

According to the embodiments of the present invention, it is preferable that a customer display unit is provided at the customer side of the terminal body opposed to the operator side.

According to the embodiments of the present invention, it is preferable that the customer display unit has a display screen extending beyond a table of the exhibition spot.

According to the embodiments of the present invention, it is preferable that the customer display unit is equipped with a data input device for allowing customers to select or enter their orders by themselves.

According to the embodiments of the present invention, it is preferable that the customer display unit is detachable from the terminal body.

According to the embodiments of the present invention, it is preferable that an angle of the customer display unit is adjustable.

According to the embodiments of the present invention, it is preferable that the customer display unit is exchangeable so that the size of the customer display unit is flexibly selectable from a plurality of types.

According to the embodiments of the present invention, it is preferable that a slide mechanism is provided to adjust a vertical position of the customer display unit.

According to the embodiments of the present invention, it is preferable that a universal joint linkage is used to connect the customer display unit to the terminal body.

According to the embodiments of the present invention, it is preferable that an arm linkage coupled by a plurality of elastic friction rings is interposed between the customer display unit and the terminal body.

According to the embodiments of the present invention, it is preferable that the terminal body has an exhibition casing space opened to the customer side thereof, with a side view of the exhibition casing space corresponding to the recessed configuration.

According to the embodiments of the present invention, it is preferable that a customer display unit is provided at the customer side of the terminal body opposed to the operator side. And, the customer display unit extends upward beyond an upper surface of a horizontally extending portion of the terminal body to hold a cover casing in the exhibition casing space while allowing the cover casing to slide in a direction normal to the customer side.

According to the embodiments of the present invention, it is preferable that the cover casing is an elastically deformable casing having a projection. And, a recess engageable with the projection of the cover casing is formed on a surface of the terminal body, so that the projection and the recess cooperatively form a slide-in and click-stop mechanism for the cover casing.

According to the embodiments of the present invention, it is preferable that a bent portion is provided at each side of the customer display unit so as to serve as a stopper for preventing the cover casing from sliding. And, the customer display unit is slidable in an up-and-down direction along a surface of the terminal body, so that the cover casing can be removed at the customer side.

According to the embodiments of the present invention, it is preferable that a protruding portion is provided on a top of the terminal body to hold an upper portion of the advertisement plate leaning along a surface of the cover casing.

According to the embodiments of the present invention, it is preferable that the customer display unit extends upward beyond an upper surface of a horizontally extending portion of the terminal body to hold a lower end of an advertisement plate at a behind side of the customer display unit.

According to the embodiments of the present invention, it is preferable that a protruding portion is formed at an upper end of the cover casing to hold an advertisement plate between the protruding portion and a top body provided on the terminal body, and the top body has an inclined surface for receiving the advertisement plate.

According to the embodiments of the present invention, it is preferable that a small camera is provided on a predetermined position at the customer side of the terminal body so that the small camera can take a photo of a customer, and a printer is provided to produce a photo of the customer printed on a receipt or a note produced as a result of sales transaction.

According to the embodiments of the present invention, it is preferable that the small camera is provided at the operator side of the terminal body so that the small camera can take a photo of an operator, and the printer produces a photo of the operator printed on a receipt or a note produced as a result of sales transaction.

According to the embodiments of the present invention, it is preferable that the small camera is operable by a foot switch provided in a foot area of the operator.

According to the embodiments of the present invention, it is preferable that the small camera is operable by a touch switch attached on a wearing thing of the operator.

According to the embodiments of the present invention, it is preferable that a customer display unit is provided at the customer side of the terminal body opposed to the operator side. The customer display unit extends upward beyond an upper surface of a horizontally extending portion of the terminal body to hold a cover casing in the exhibition casing space. And, a top body is supported on an upper portion of the terminal body and is rotatable between a closed position and an opened position, so that the cover casing is held by the top body and the customer display unit in the closed condition while the cover casing is removable from the exhibition casing space in the opened condition.

According to the embodiments of the present invention, it is preferable that the top body conceals electric parts necessary for electric power supply to an exhibition object in the cover casing.

According to the embodiments of the present invention, it is preferable that an electric display unit is accommodated in the cover casing.

BRIEF DESCRIPTION OF THE DRAWINGS

The above and other objects, features and advantages of the present invention will become more apparent from the following detailed description which is to be read in conjunction with the accompanying drawings, in which:

FIG. 31A is an enlarged front view showing a slide mechanism of the sales transaction terminal device in accordance with the ninth embodiment of the present invention;

FIG. 31B is a cross-sectional view showing the slide mechanism of the sales transaction terminal device in accordance with the ninth embodiment of the present invention;

FIG. 37A is a side view showing a sales transaction terminal device in accordance with a twenty-third embodiment of the present invention;

FIG. 37B (cross-sectional) and FIG. 37C (behind) are views cooperatively showing details of a slide-in and click-stop mechanism of the sales transaction terminal device in accordance with the twenty-third embodiment of the present invention;

DESCRIPTION OF THE PREFERRED EMBODIMENTS

Figure 1:
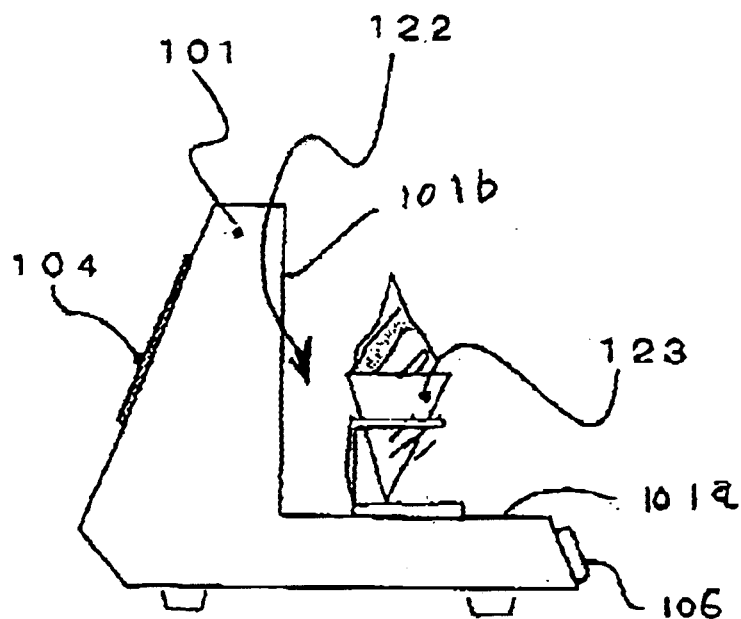
FIG. 1 is a side view showing a sales transaction terminal device in accordance with a first embodiment of the present invention.

Hereinafter, preferred embodiments of the present invention will be explained with reference to the attached drawings. Identical parts are denoted by the same reference numerals throughout the views.

In the following explanation, it is assumed that, when a sales transaction terminal device is placed in position, a "front" side of this sales transaction terminal device is referred to as an operator side facing to an operator while its "behind" side is referred to as a customer side facing to a customer.

First Embodiment

FIG. 1 shows a sales transaction terminal device (or a front counter register) in accordance with a first embodiment of the present invention. In FIG. 1, the sales transaction terminal device comprises a terminal body 101 configured into an L shape when seen from its side. More specifically, the L-shaped terminal body 101 comprises a commodity table 101a provided at the customer side thereof so as to extend horizontally outward (i.e., toward a customer) and a wall 101b rising upward perpendicularly from the inner end of the commodity table 101a. The commodity table 101a and the wall 101b cooperatively form an exhibition spot 122 opened to the customer side so that customers can take a look at a commodity sample 123 exhibited or displayed on the commodity table 101a.

An operator display unit 104, equipped with an ordinary touch panel, is provided at the operator side of the L-shaped terminal body 101. The operator can perform a sales transaction by manipulating this operator display unit 104 (i.e., by using the touch panel) when a customer places an order. Furthermore, a customer display unit 106 is provided at a front end of the customer side of the terminal body 101. The customer display unit 106 displays a menu of sales commodities or a list of their prices.

In this manner, the sales transaction terminal device of the first embodiment comprises the terminal body 101 having an L-shaped configuration when seen from its side. The terminal body 101 has the exhibition spot 122 at the customer side thereof. A side view of the exhibition spot 122 corresponds to the L-shaped configuration. The operator display unit 104 is provided at the operator side of the terminal body 101 for allowing an operator to perform a sales transaction when a customer places an order at a shop counter where the sales transaction terminal device is placed.

Thus, the first embodiment of the present invention makes it possible to allow an operator to perform the sales transaction in a face-to-face manner. Furthermore, the first embodiment makes it possible to utilize the front part of the L-shaped terminal body 101 as a useful space for various guidance and customer service exhibitions, such as commodity sample display, advertizing display, menu display or sales price list display.

Second Embodiment

Figure 2:
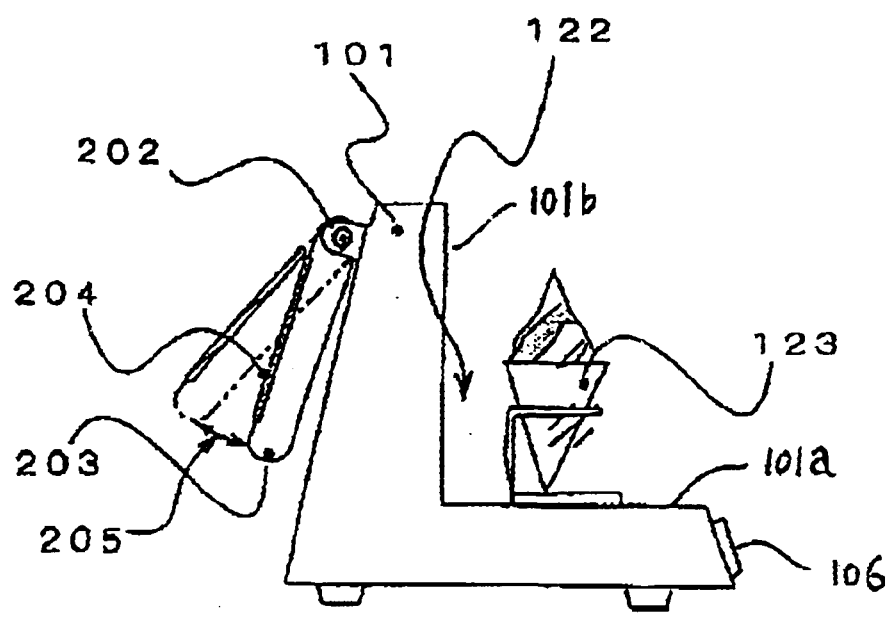
FIG. 2 is a side view showing a sales transaction terminal device in accordance with a second embodiment of the present invention.

FIG. 2 shows a sales transaction terminal device in accordance with a second embodiment of the present invention. The sales transaction terminal device shown in FIG. 2 is different from the device shown in FIG. 1 in the arrangement of an operator display unit 204 which is swingable.

More specifically, a body 203 of the operator display unit 204 is rotatably hinged about a shaft 202 which extends horizontally and is provided at an upper part of the operator side of the L-shaped terminal body 101. This arrangement makes it possible to optimize the angle of the operator display unit 204 according to the eye position of each operator. FIG. 2 shows an angular zone 205 within which the operator can adjust the angle of the operator display unit 204.

The arrangement of the second embodiment makes it possible to optimize the position of the operator display unit 204 according to the physical size of each operator.

Third Embodiment

Figure 3:
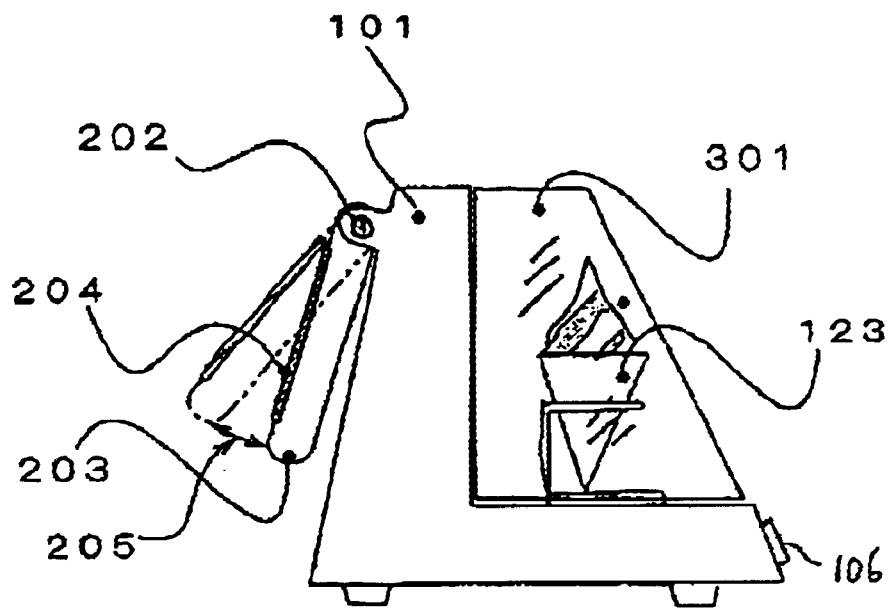
FIG. 3 is a side view showing a sales transaction terminal device in accordance with a third embodiment of the present invention.
Figure 4:
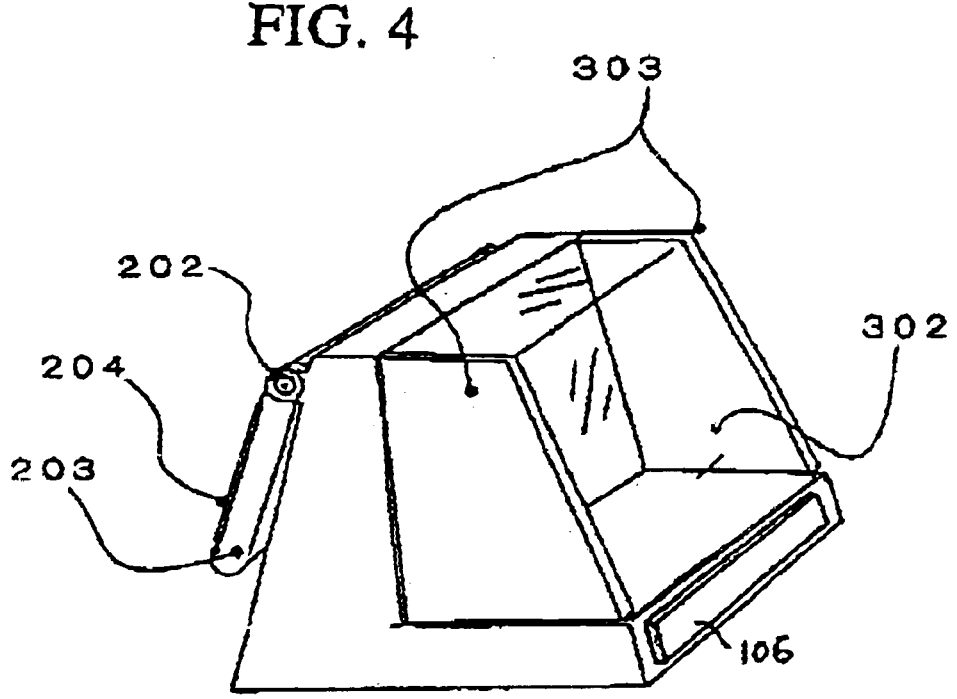
FIG. 4 is a perspective view showing another sales transaction terminal device in accordance with the third embodiment of the present invention.

FIGS. 3 and 4 show sales transaction terminal devices in accordance with a third embodiment of the present invention. A sales transaction terminal device shown in FIG. 3 is different from the device shown in FIG. 2 in provision of a cover casing 301. The cover casing 301 is transparent so that customers can look the commodity sample 123 through the cover casing 301. The cover casing 301 conceals the commodity sample 123 from outside dusts or the like. Thus, the third embodiment of the present invention provides a hygienically preferable exhibition.

A sales transaction terminal device shown in FIG. 4 is a modification of the device shown in FIG. 3 and different in the detailed arrangement of a cover casing 302. The cover casing 302 has a transparent portion at the front face and a top face thereof and a non-transparent (i.e., opaque) portion 303 at both side faces thereof.

Fourth Embodiment

Figure 5:
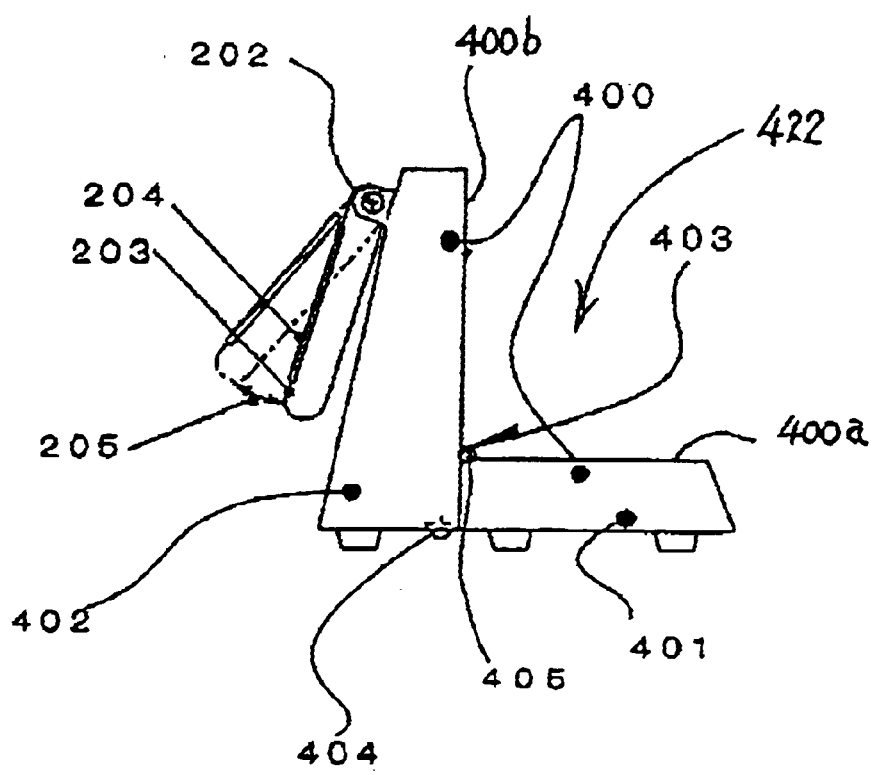
FIG. 5 is a side view showing a sales transaction terminal device in accordance with a fourth embodiment of the present invention.
Figure 6:
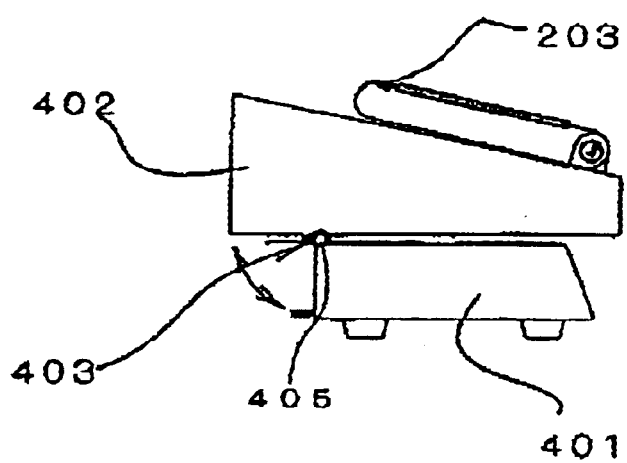
FIG. 6 is a side view showing a folded condition of the sales transaction terminal device in accordance with the fourth embodiment of the present invention.

FIGS. 5 and 6 show a sales transaction terminal device in accordance with a fourth embodiment of the present invention. The sales transaction terminal device of the fourth embodiment is characterized in that an L-shaped terminal body 400 consists of a horizontal portion 401 and a vertical portion 402 which cooperatively constitute an L-shaped configuration when seen from a side of the terminal body 400. The horizontal portion 401 has a top surface 400a serving as a commodity table. The vertical portion 402 has a customer-side wall 400b cooperating with the top surface 400a of the horizontal portion 401 to form an exhibition spot 422 opened to the customer side. The vertical portion 402 is rotatable about a shaft 405 of a hinge 403. The hinge 403 is provided at a corner of the horizontal portion 401 and the vertical portion 402 for connecting them. A lock member 404 is provided at the bottom of the vertical portion 402 for fixing the vertical portion 402 in a standing position to the horizontal portion 401. The operator display unit 204 and associated members 202 and 203, provided at the operator side of the vertical portion 402, are identical with that of the second embodiment.

As shown in FIG. 6, the vertical portion 402 is foldable when the lock member 404 is unlocked. Namely, the vertical portion 402 rotates about the hinge 403 and lies on the horizontal portion 401.

Fifth Embodiment

Figure 7:
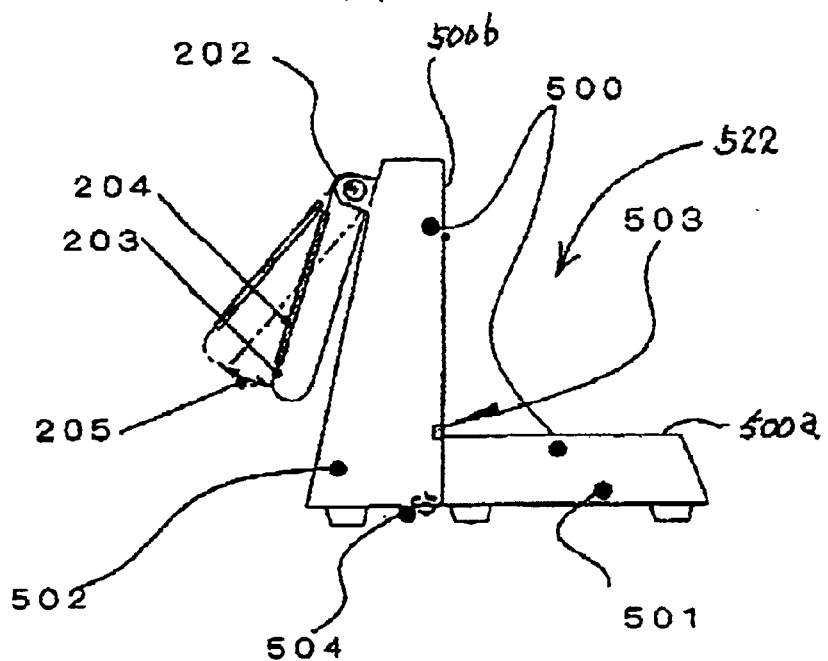
FIG. 7 is a side view showing a sales transaction terminal device in accordance with a fifth embodiment of the present invention.
Figure 8:
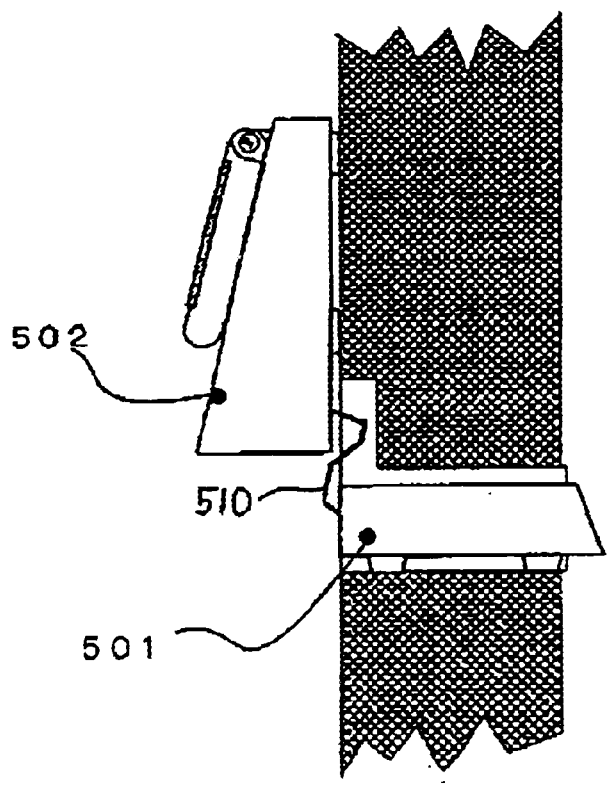
FIG. 8 is a side view showing a separated condition of the sales transaction terminal device in accordance with the fifth embodiment of the present invention.

FIGS. 7 and 8 show a sales transaction terminal device in accordance with a fifth embodiment of the present invention. The sales transaction terminal device of the fifth embodiment is different from the device of the fourth embodiment in that an L-shaped terminal body 500 is separable into two portion.

More specifically, the L-shaped terminal body 500 consists of a horizontal portion 501 and a vertical portion 502 which are identical with the corresponding portions 401 and 402 of the fourth embodiment except that the vertical portion 502 is detachable from the horizontal portion 501.

The horizontal portion 501 has a top surface 500a serving as a commodity table. The vertical portion 502 has a customer-side wall 500b cooperating with the top surface 500a of the horizontal portion 501 to form an exhibition spot 522 opened to the customer side.

An upper lock member 503 is provided to fix the horizontal portion 501 and the vertical portion 502 at the corner of L-shaped terminal body 500. Another lock member 504 is provided to fix the horizontal portion 501 and the vertical portion 502 at the bottom of L-shaped terminal body 500. The operator display unit 204 and associated members 202 and 203, provided at the operator side of the vertical portion 502, are identical with that of the second embodiment.

As shown in FIG. 8, the vertical portion 502 is detachable from the horizontal portion 501 when the upper and lower lock members 503 and 504 are unlocked, although the portions 501 and 502 are electrically connected via a cable 510. The vertical portion 502 can be hung on a wall by means of appropriate fixing members. Meanwhile, the horizontal portion 501 can be placed in an accommodation space (hole) penetrating the wall.

Sixth Embodiment

Figure 9:
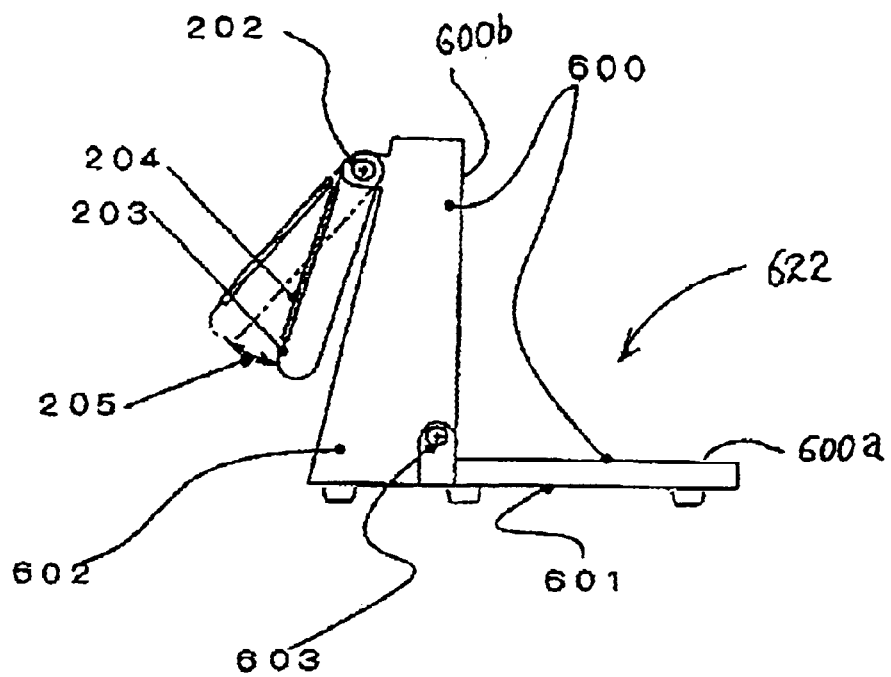
FIG. 9 is a side view showing a sales transaction terminal device in accordance with a sixth embodiment of the present invention.
Figure 10:
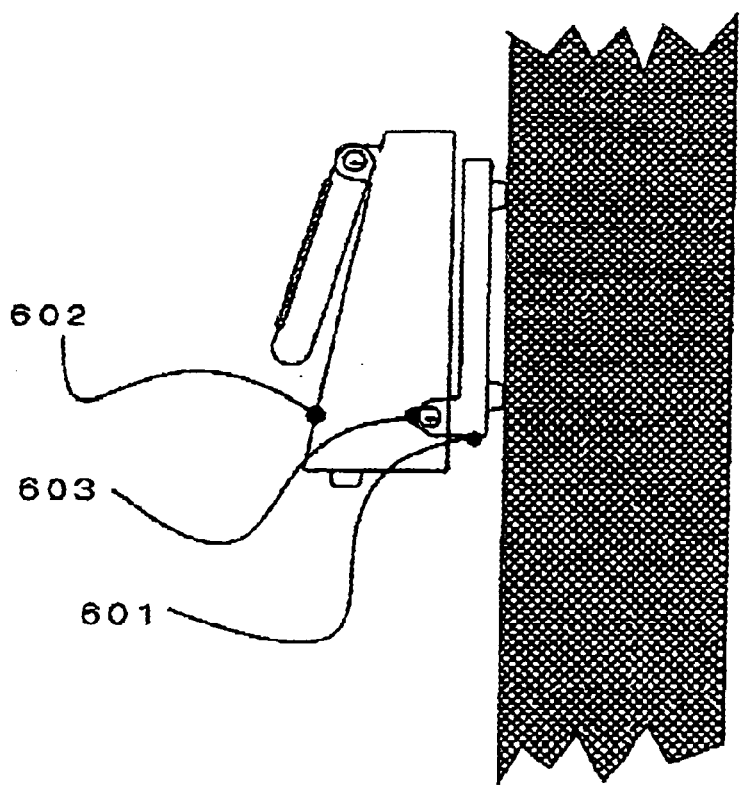
FIG. 10 is a side view showing a folded condition of the sales transaction terminal device in accordance with the sixth embodiment of the present invention.

FIGS. 9 and 10 show a sales transaction terminal device in accordance with a sixth embodiment of the present invention. The sales transaction terminal device of the sixth embodiment is characterized in that an L-shaped terminal body 600 consists of a horizontal portion 601 and a vertical portion 602 which cooperatively constitute an L-shaped configuration when seen from a side of the terminal body 600. The horizontal portion 601 is constituted by a platelike (or table-like) member which is fairly thin compared with the vertical portion 602. The horizontal portion 601 has a top surface 600a serving as a commodity table. The vertical portion 602 has a customer-side wall 600b cooperating with the top surface 600a of the horizontal portion 601 to form an exhibition spot 622 opened to the customer side.

The horizontal portion 601 is foldable (i.e., rotatable) about a shaft of a hinge member 603 provided at the bottom of the vertical portion 602. The rest of the sixth embodiment is similar to that of the fourth embodiment.

When the horizontal portion 601 is unfolded about the hinge member 603 as shown in FIG. 9, the sales transaction terminal device can be placed on a shop counter with the vertical portion 602 held at a standing position.

When the horizontal portion 601 is folded about the hinge member 603 as shown in FIG. 10, the sales transaction terminal device can be hung on a shop wall with the vertical portion 602 held at a standing position.

In this manner, the sixth embodiment allows operators to selectively use the sales transaction terminal device as a desktop type placeable on the shop counter or a wall-mounted type installable on the shop wall.

Seventh Embodiment

Figure 11:
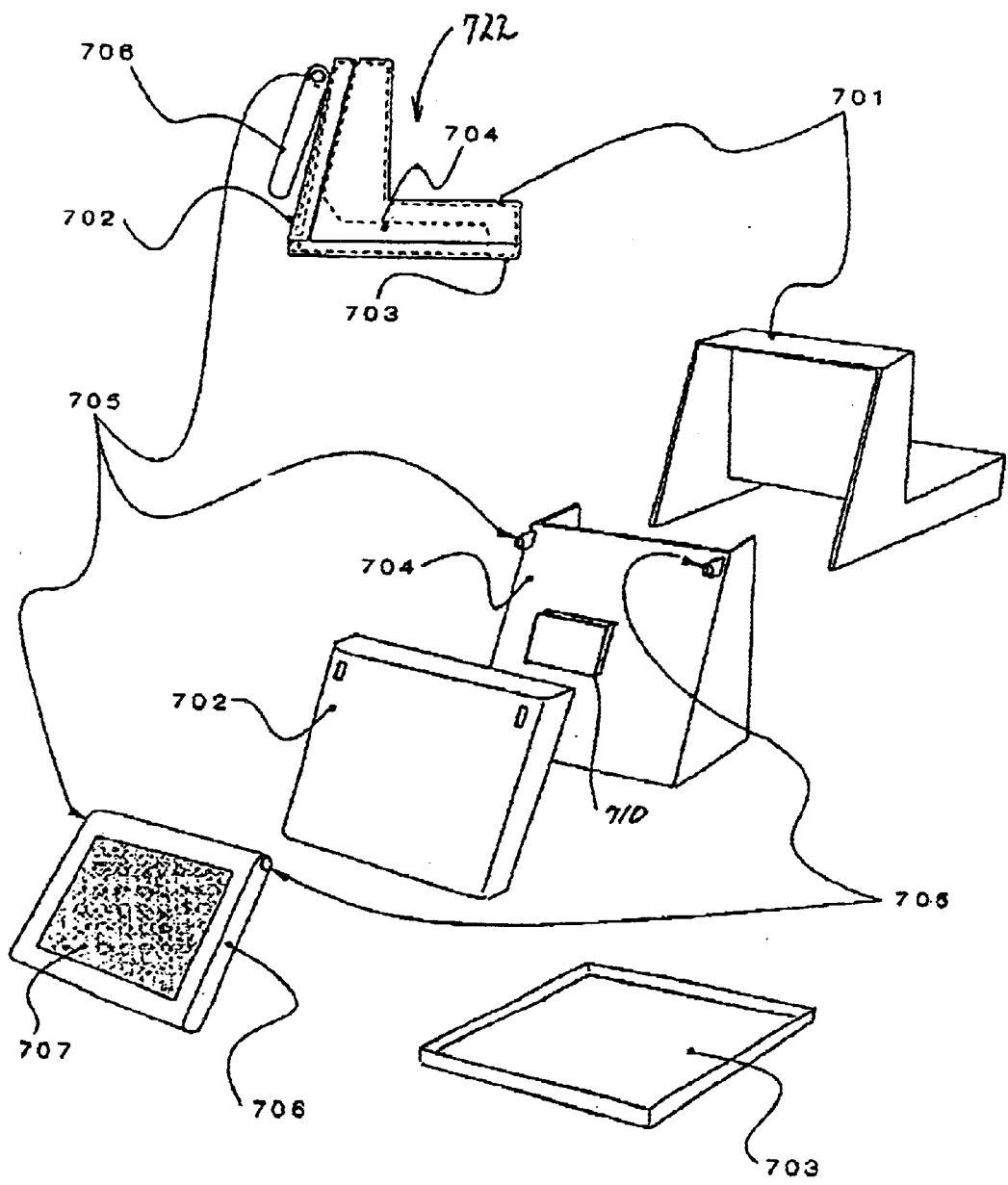
FIG. 11 is an exploded perspective view showing a sales transaction terminal device in accordance with a seventh embodiment of the present invention.

FIG. 11 shows a sales transaction terminal device in accordance with a seventh embodiment of the present invention. The sales transaction terminal device of the seventh embodiment is characterized in that an L-shaped terminal body comprises a customer-side casing 701 having an L-shaped side wall, an operator-side casing 702, and a base plate 703 which cooperatively surround a frame body 704 on which a circuit board 710 and related devices are installable.

The customer-side casing 701 has an L-shaped configuration when seen from its side. The customer-side casing 701 has a horizontal surface serving as a commodity table and a vertical wall cooperating with the horizontal surface to form an exhibition spot 722 opened to the customer side.

An operator display unit 707 and its body 706 are rotatably supported via a hinge member 705 to the upper portion of the L-shaped terminal body (e.g., to the operator-side casing 702 or to the frame body 704), so that the angle of the operator display unit 706 is adjustable.

According to the structure of the seventh embodiment of the present invention, the casing constituting the L-shaped terminal body is separable into a plurality of parts. This is advantageous in improving productivity as well as facilitating maintenance work.

Eighth Embodiment

Figure 12:
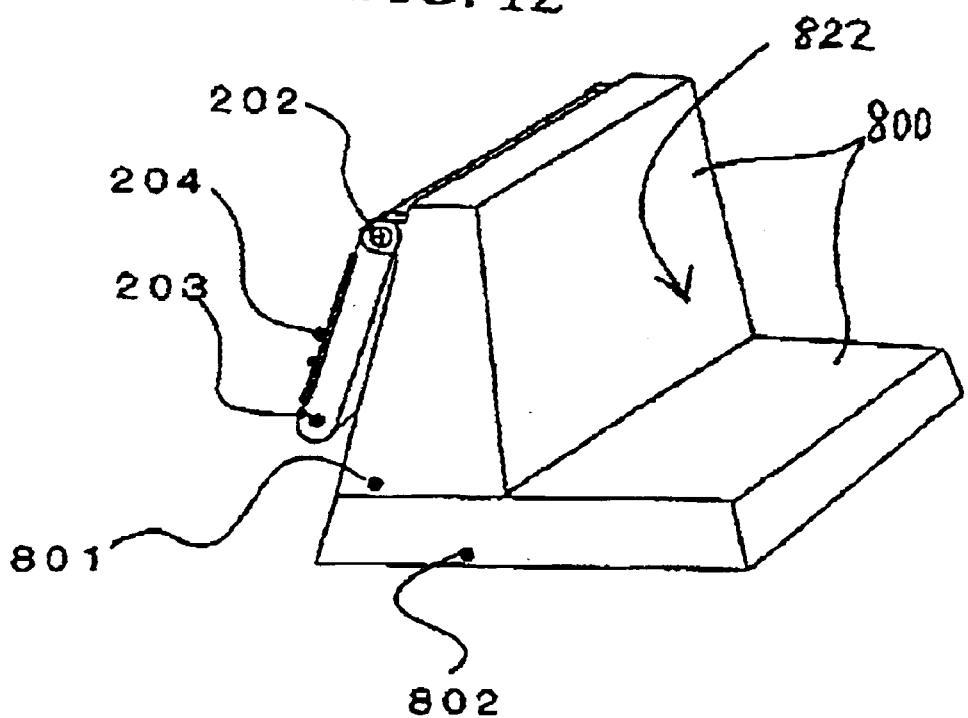
FIG. 12 is a perspective view showing a sales transaction terminal device in accordance with an eighth embodiment of the present invention.
Figure 13:
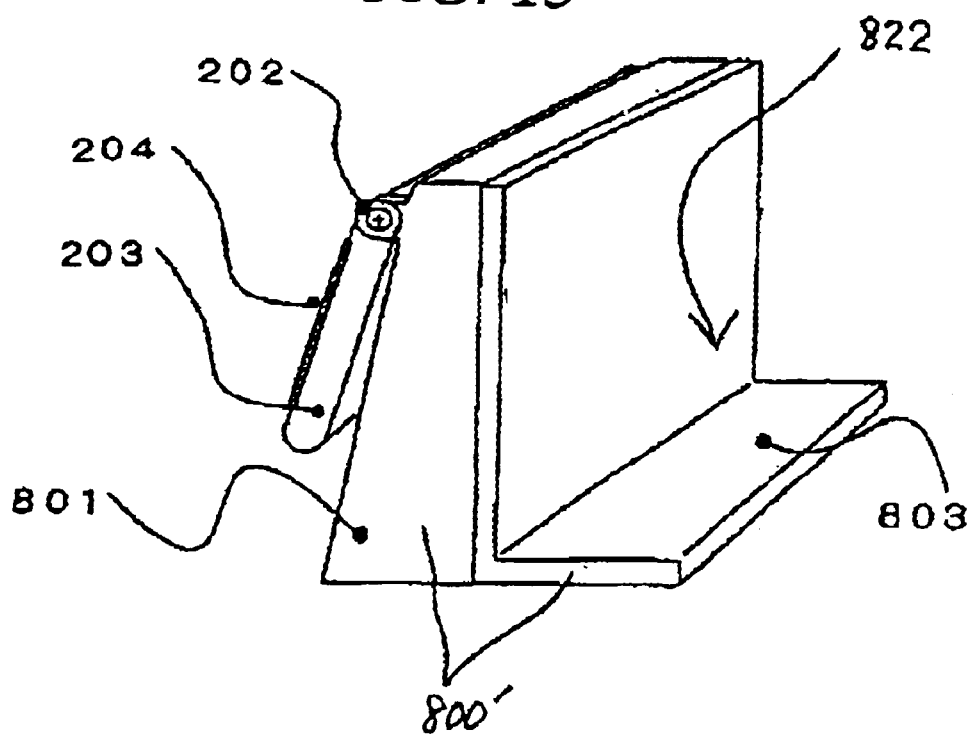
FIG. 13 is a perspective view showing another sales transaction terminal device in accordance with the eighth embodiment of the present invention.

FIGS. 12 and 13 show sales transaction terminal devices in accordance with an eighth embodiment of the present invention.

The sales transaction terminal device shown in FIG. 12 is characterized in that an L-shaped terminal body 800 consists of a standing portion 801 and a lying base portion 802 which cooperatively constitute an L-shaped configuration when seen from a side of the terminal body 800. The standing portion 801, which is triangular or trapezoidal when seen from its side, has a customer-side wall serving as part of an exhibition spot 822 and an operator-side wall on which the operator display unit 204 and its body 203 are hingedly supported (via the shaft 202). The lying base portion 802 is connected to a bottom of the standing portion 801. In other words, the lying base portion 802 has an upper surface on which the standing portion 801 is mounted. The operator-side wall of the standing portion 801 and the upper surface of the lying base portion 802 cooperatively form the exhibition spot 822.

The sales transaction terminal device shown in FIG. 13 is characterized in that an L-shaped terminal body 800' consists of the standing portion 801 and an L-shaped base 803. The base portion 803, having an L-shaped configuration when seen from a side of the terminal body 800', defines an exhibition spot 822'. The standing portion 801, which is triangular or trapezoidal when seen from its side, has a customer-side wall which is connected to a behind surface of the L-shaped base portion 803.

Ninth Embodiment

Figure 14:
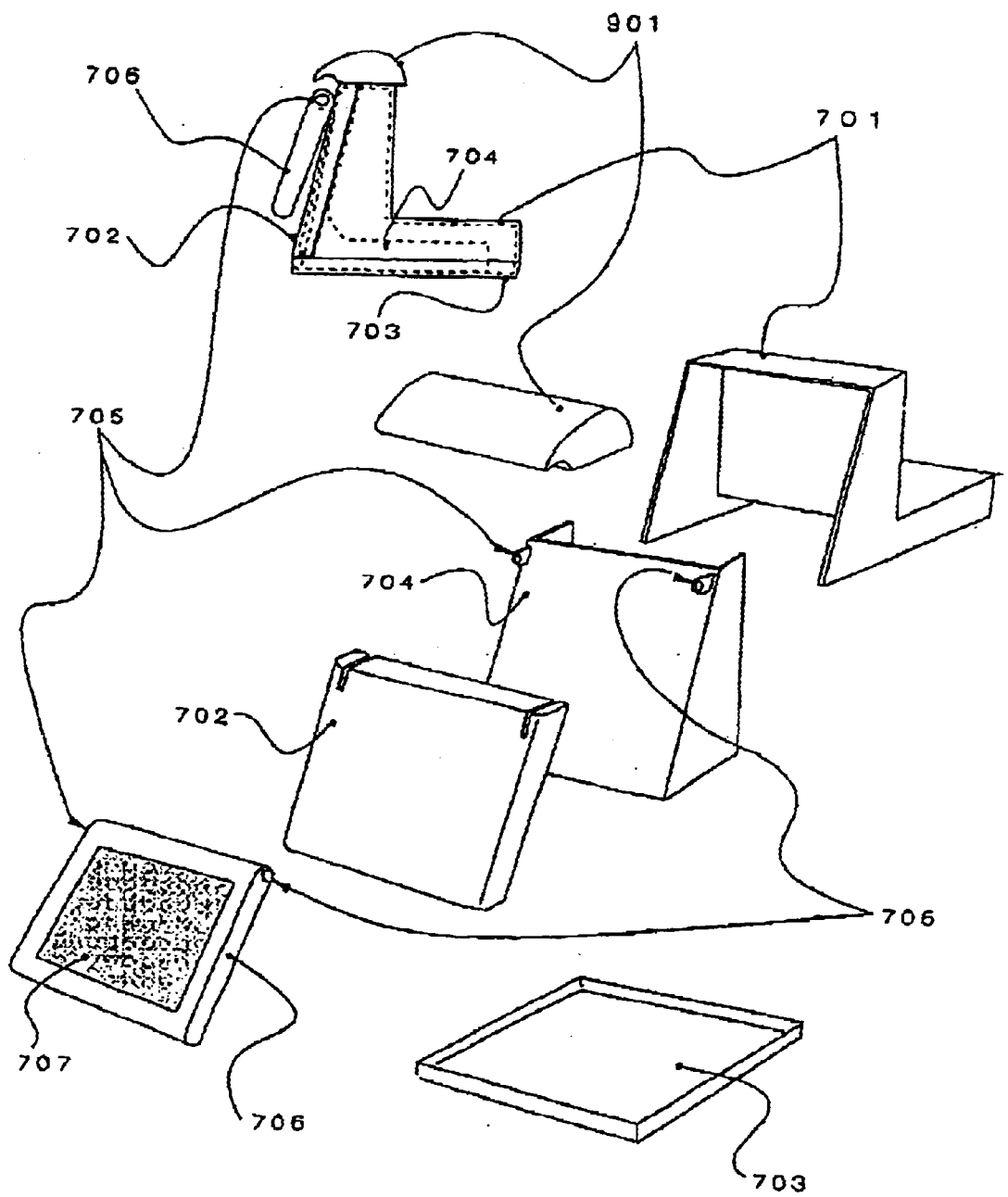
FIG. 14 is an exploded perspective view showing a sales transaction terminal device in accordance with a ninth embodiment of the present invention.

FIG. 14 shows a sales transaction terminal device in accordance with a ninth embodiment of the present invention. The sales transaction terminal device of the ninth embodiment is substantially identical with the device shown in FIG. 11 except for a roof 901 provided on the top of the standing portion of the L-shaped terminal body.

Tenth Embodiment

Figure 15:
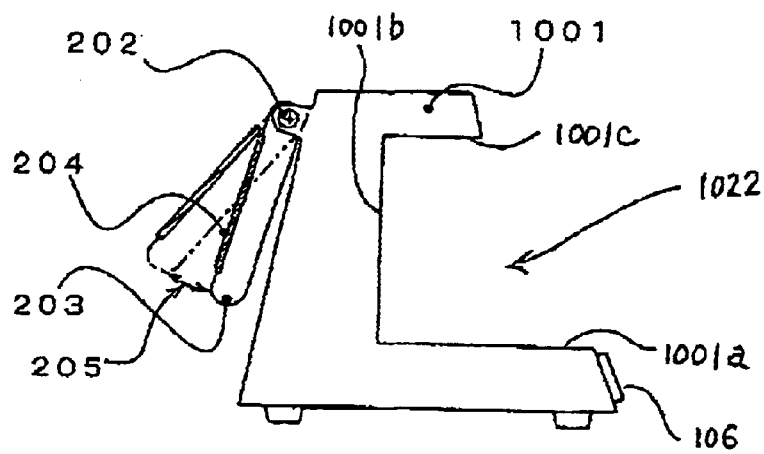
FIG. 15 is a side view showing a sales transaction terminal device in accordance with a tenth embodiment of the present invention.
Figure 16:
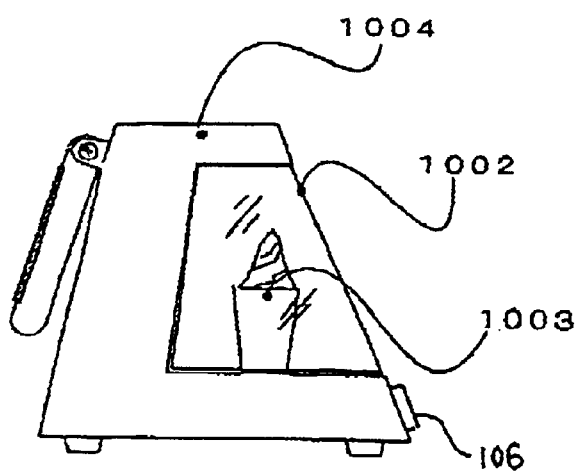
FIG. 16 is a side view showing another sales transaction terminal device in accordance with the tenth embodiment of the present invention.

FIGS. 15 and 16 show sales transaction terminal devices in accordance with a tenth embodiment of the present invention. The sales transaction terminal device shown in FIG. 15 comprises a terminal body 1001 configured into a lying U shape when seen from its side. More specifically, the lying U-shaped terminal body 1001 comprises a commodity table 1001a provided at the customer side thereof so as to extend horizontally outward (i.e., toward a customer), a wall 1001b rising upward perpendicularly from the inner end of the commodity table 1001a, and a ceiling 1001c extending horizontally outward from the upper end of the wall 1001b. The commodity table 1001a, the wall 1001b, and the ceiling 1001C cooperatively form an exhibition spot 1022 opened to the customer side so that customers can take a look at a commodity sample exhibited or displayed on the commodity table 1001a.

An operator display unit 204, equipped with an ordinary touch panel, is provided at the operator side of the lying U-shaped terminal body 1001. The operator can perform a sales transaction by manipulating this operator display unit 204 (i.e., by using the touch panel) when a customer places an order.

A body 203 of the operator display unit 204 is rotatably hinged about a shaft 202 which extends horizontally and is provided at an upper part of the operator side of the lying U-shaped terminal body 1001. This arrangement makes it possible to optimize the angle of the operator display unit 204 according to the physical size of each operator (i.e., the eye position of each operator). The operator can adjust the angle of the operator display unit 204 within an angular zone 205.

Furthermore, a customer display unit 106 is provided at a front end of the customer side of the terminal body 1001. The customer display unit 106 displays a menu of sales commodities or a list of their prices.

In this manner, the sales transaction terminal device of the tenth embodiment comprises the terminal body 1001 having a lying U-shaped configuration when seen from its side. The terminal body 1001 has the exhibition spot 1022 at the customer side thereof. A side view of the exhibition spot 1022 corresponds to the lying U-shaped configuration. The operator display unit 204 and its body 203 are swingably provided at the operator side of the terminal body 1001 for allowing an operator to perform a sales transaction when a customer places an order at a shop counter where the sales transaction terminal device is placed.

Thus, the tenth embodiment of the present invention makes it possible to allow an operator to perform the sales transaction in a face-to-face manner. Furthermore, the tenth embodiment makes it possible to utilize the front part of the lying U-shaped terminal body 1001 as a useful space for various guidance and customer service exhibitions, such as commodity sample display, advertizing display, menu display or sales price list display.

The sales transaction terminal device shown in FIG. 16 is different from the device shown in FIG. 15 in that a cover casing 1002 is provided. The cover casing 1002 is transparent so that customers can look a commodity sample 1003 through the cover casing 1002. The cover casing 1002 conceals the commodity sample 1003 from outside dusts or the like. Thus, the tenth embodiment of the present invention provides a hygienically preferable exhibition.

Eleventh Embodiment

Figure 17:
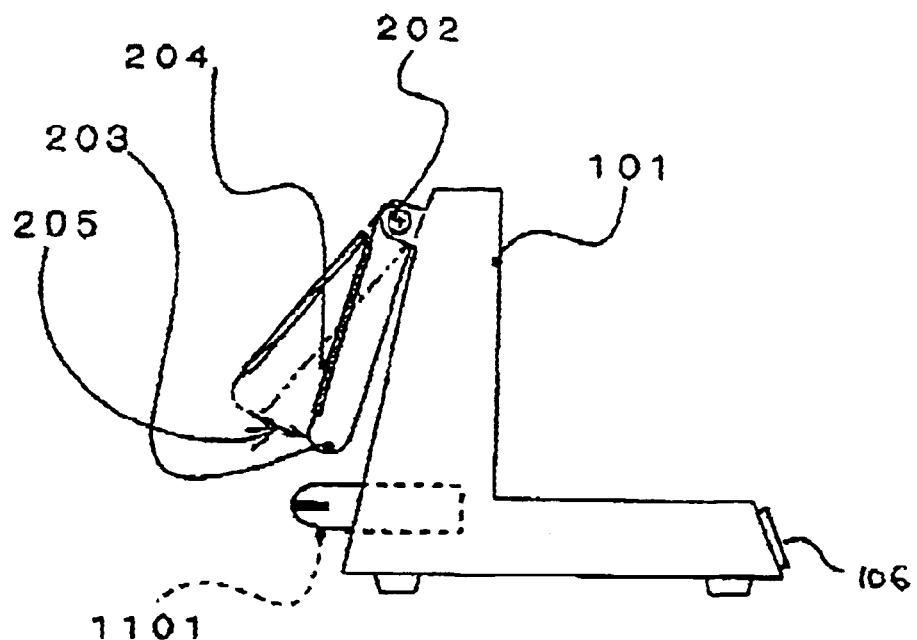
FIG. 17 is a side view showing a sales transaction terminal device in accordance with an eleventh embodiment of the present invention.

FIG. 17 shows a sales transaction terminal device in accordance with an eleventh embodiment of the present invention. The sales transaction terminal device shown in FIG. 17 is similar to the device shown in FIG. 2 except for provision of a media card reader 1101. The media card reader 1101 is provided at the operator side of the L-shaped terminal body 101 at a lower portion so that the media card reader 1101 does not interfere with the body 203 of the operator display unit 204. The media card reader 1101 protrudes from the operator-side surface of the L-shaped terminal body 101. With this arrangement, it becomes possible to allow an operator to easily enter or remove a media card into or from the media card reader 1101, while the sales transaction terminal device can be maintained at a compact size.

Twelfth Embodiment

Figure 18:
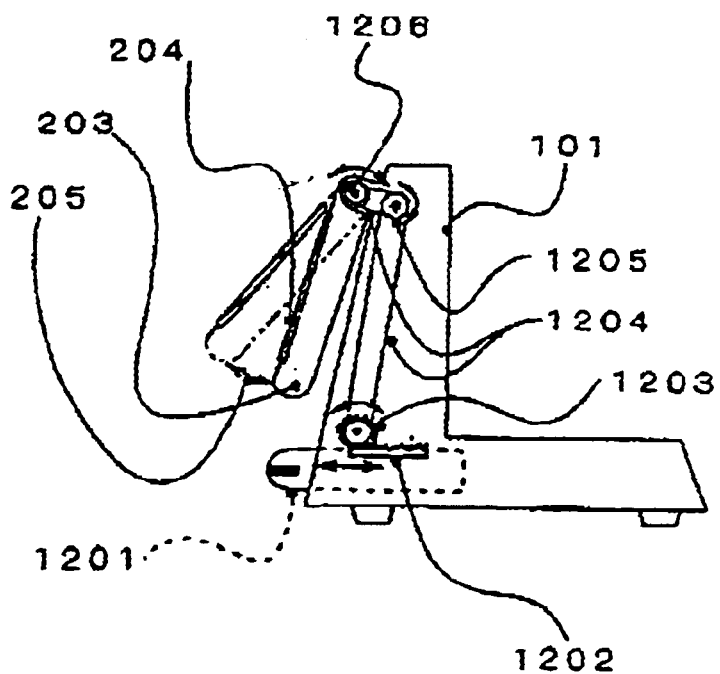
FIG. 18 is a side view showing a sales transaction terminal device in accordance with a twelfth embodiment of the present invention.
Figure 19:
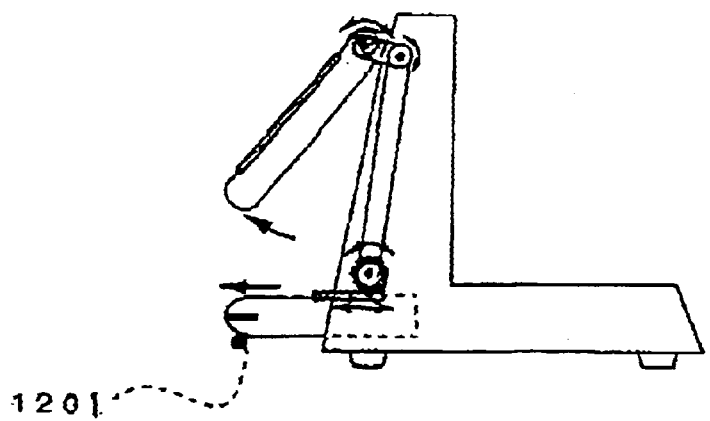
FIG. 19 is a side view showing a slide mechanism of the sales transaction terminal device in accordance with the twelfth embodiment of the present invention.

FIGS. 18 and 19 show a sales transaction terminal device in accordance with a twelfth embodiment of the present invention. The sales transaction terminal device shown in FIGS. 18 and 19 is different from the device shown in FIG. 17 in that the media card reader 1201 is slidable in a back-and-forth direction (i.e., in the horizontal direction).

More specifically, the media card reader 1201 is slidable in accordance with an angle adjustment of the operator display unit 204. When an operator pulls the lower end of the operator display unit 204 (i.e., its body 203), the media card reader 1201 is slid in the same direction by a slide mechanism. This linkage facilitates the operator's inserting or removing a media card into or from the media card reader 1201 without being obstructed by the display unit 204 and its body 203.

The slide mechanism for the media card reader 1201 includes a shaft 1206 attached to the upper end of the display unit body 203. A timing pulley is coaxially fixed to the shaft 1206. The angular change of the display unit body 203 is transmitted from the shaft 1206 to an intermediate timing pulley 1205 via a timing belt 1204 entrained between the two pulleys and is further transmitted from the intermediate timing pulley 1205 to a drive pinion 1203 via an another timing belt 1204. A driven rack 1202 is attached to the upper part of the media card reader 1201. The driven rack 1202 meshes with the drive pinion 1203. With the arrangement of this slide mechanism, the angular change of the display unit body 203 is finally converted into a slide movement of the media card reader 1201.

Accordingly, as shown in FIG. 19, the media card reader 1201 slides toward the operator (i.e., as indicated by an arrow) when the operator pulls the lower end of the operator display unit 204 (i.e., its body 203) for angular adjustment. Then, the slide movement of the media card reader 1201 stops in response to completion of the angular adjustment of the operator display unit 204.

Thirteenth Embodiment

Figure 20:
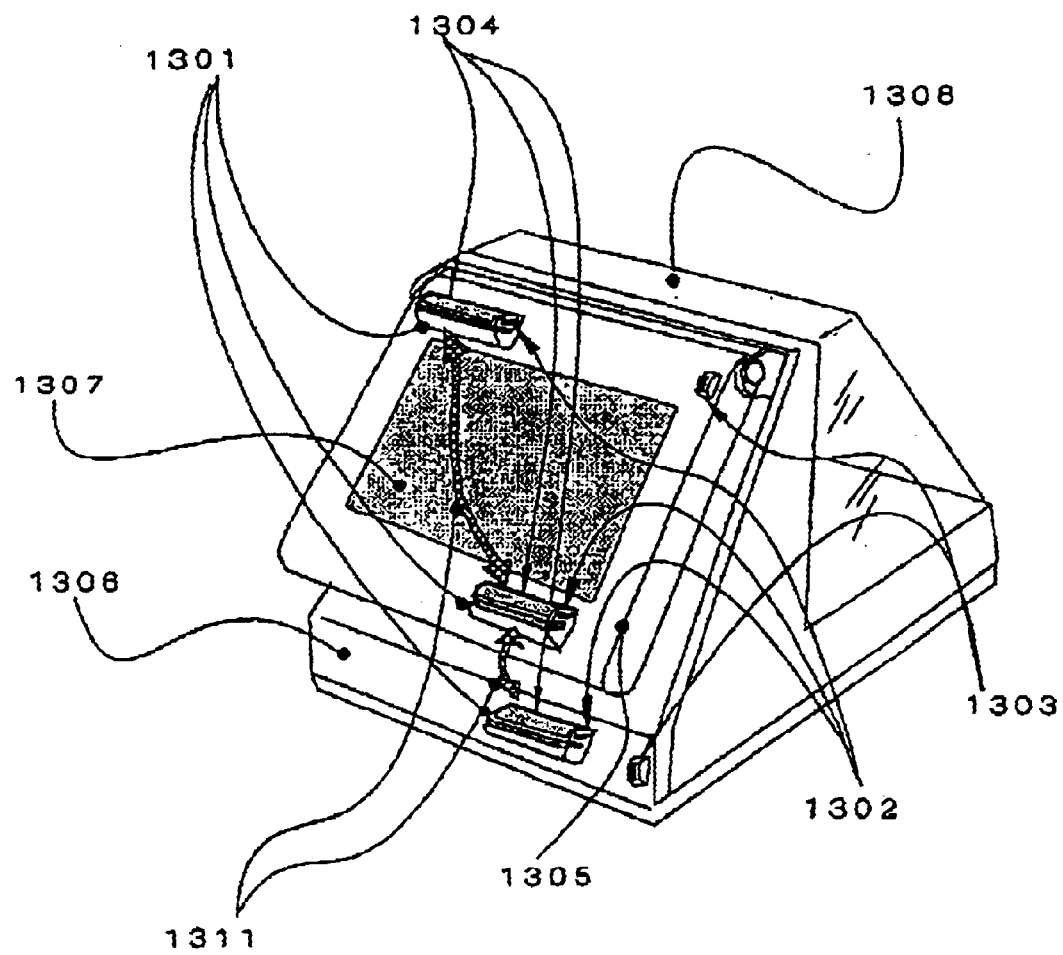
FIG. 20 is a perspective view showing a sales transaction terminal device in accordance with a thirteenth embodiment of the present invention.

FIG. 20 shows a sales transaction terminal device in accordance with a thirteenth embodiment of the present invention. The sales transaction terminal device shown in FIG. 20 is characterized in that the position of a media card reader 1301 is flexibly changeable.

For example, the media card reader 1301 is placeable below the lower end of an operator display unit body 1305 (i.e., at a lower portion 1306 of the operator side of the L-shaped terminal body). The position of the media card reader 1301 is flexibly changed to other places. As indicated by arrows 1311 in FIG. 20, the media card reader 1301 can be shifted to a lower peripheral end or an upper peripheral end of an operator display unit 1307.

To this end, the media card reader 1301 has a magnet (not shown) equipped on its bottom so that the media card reader 1301 can be held on the surface of the terminal body or the display unit body (when they are metallic) by a magnetic force produced by the magnet. Alternatively, an adhesive tape (not shown) can be used to firmly hold the media card reader 1301 on a non-metal surface of the terminal body or the display unit body.

An optical/electric energy receiving section 1304 is provided on the top of the media card reader 1301. The optical/electric energy receiving section 1304 may be a solar battery, or a radio induction or similar device.

A radio communication section 1302 is provided on a side surface of the media card reader 1301 to transmit and receive an infrared ray or weak radio wave to and from a stationary radio communication section 1303. The stationary radio communication section 1303 is provided on an appropriate portion of the display unit body 1305 or the terminal body and is connected via a cable to a power supply section or a control section (e.g., a microprocessor) housed in the terminal body. With this arrangement, the radio communication section 1302 can implement wireless data communication with the control section of the sales transaction terminal device. Reference numeral 1308 denotes a cover casing of the exhibition spot.

Thus, the thirteenth embodiment makes it possible to flexibly move the media card reader 1301 to an appropriate position according to the physical condition (height, dominant hand, etc) of an operator.

Fourteenth Embodiment

Figure 21:
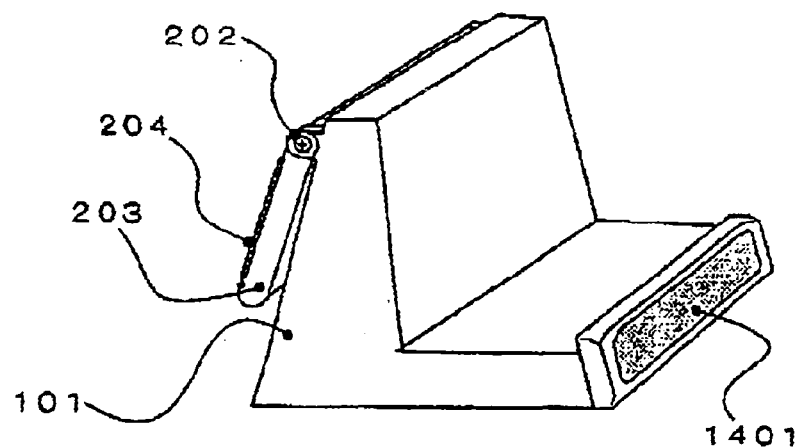
FIG. 21 is a perspective view showing a sales transaction terminal device in accordance with a fourteenth embodiment of the present invention.

FIG. 21 shows a sales transaction terminal device in accordance with a fourteenth embodiment of the present invention. The sales transaction terminal device shown in FIG. 21 has a customer display unit 1401 provided at a front end of the customer side of the L-shaped terminal body 101. The customer display unit 1401 displays a menu of sales commodities or a list of their prices. With this arrangement, customers can easily obtain information that the customers want to know.

Fifteenth Embodiment

Figure 22:
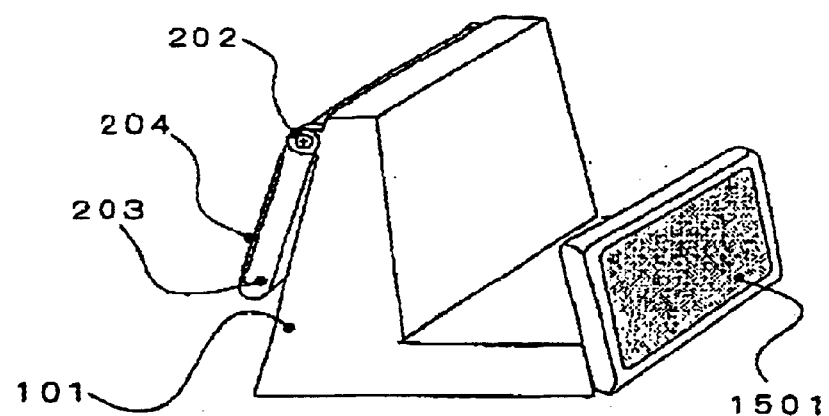
FIG. 22 is a perspective view showing a sales transaction terminal device in accordance with a fifteenth embodiment of the present invention.

FIG. 22 shows a sales transaction terminal device in accordance with a fifteenth embodiment of the present invention. The sales transaction terminal device shown in FIG. 22 has a customer display unit 1501 provided at a front end of the customer side of the L-shaped terminal body 101. The customer display unit 1501 is large compared with the customer display unit 1401 of the fourteenth embodiment.

The customer display unit 1501 has an enlarged display screen extending upward beyond the upper surface (i.e., commodity table) of the L-shaped terminal body 101. The customer display unit 1501 can display a great amount of sales information or data.

The customer display unit 1501 is equipped with an ordinary touch panel or a key board to allow customers to select or enter their orders by themselves.

Sixteenth Embodiment

Figure 23:
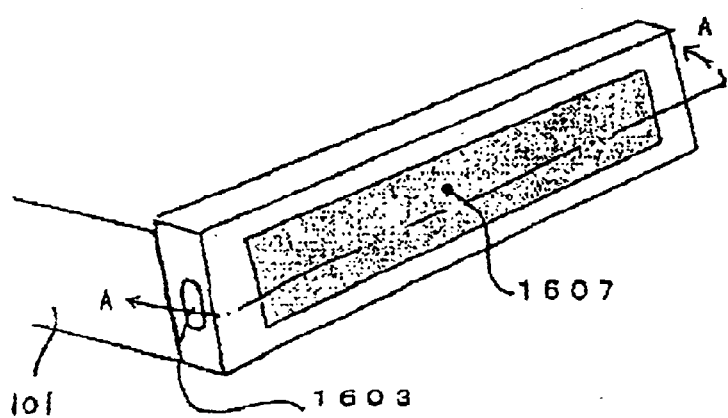
FIG. 23 is a perspective view showing a removable customer display unit of a sales transaction terminal device in accordance with a sixteenth embodiment of the present invention.
Figure 24:
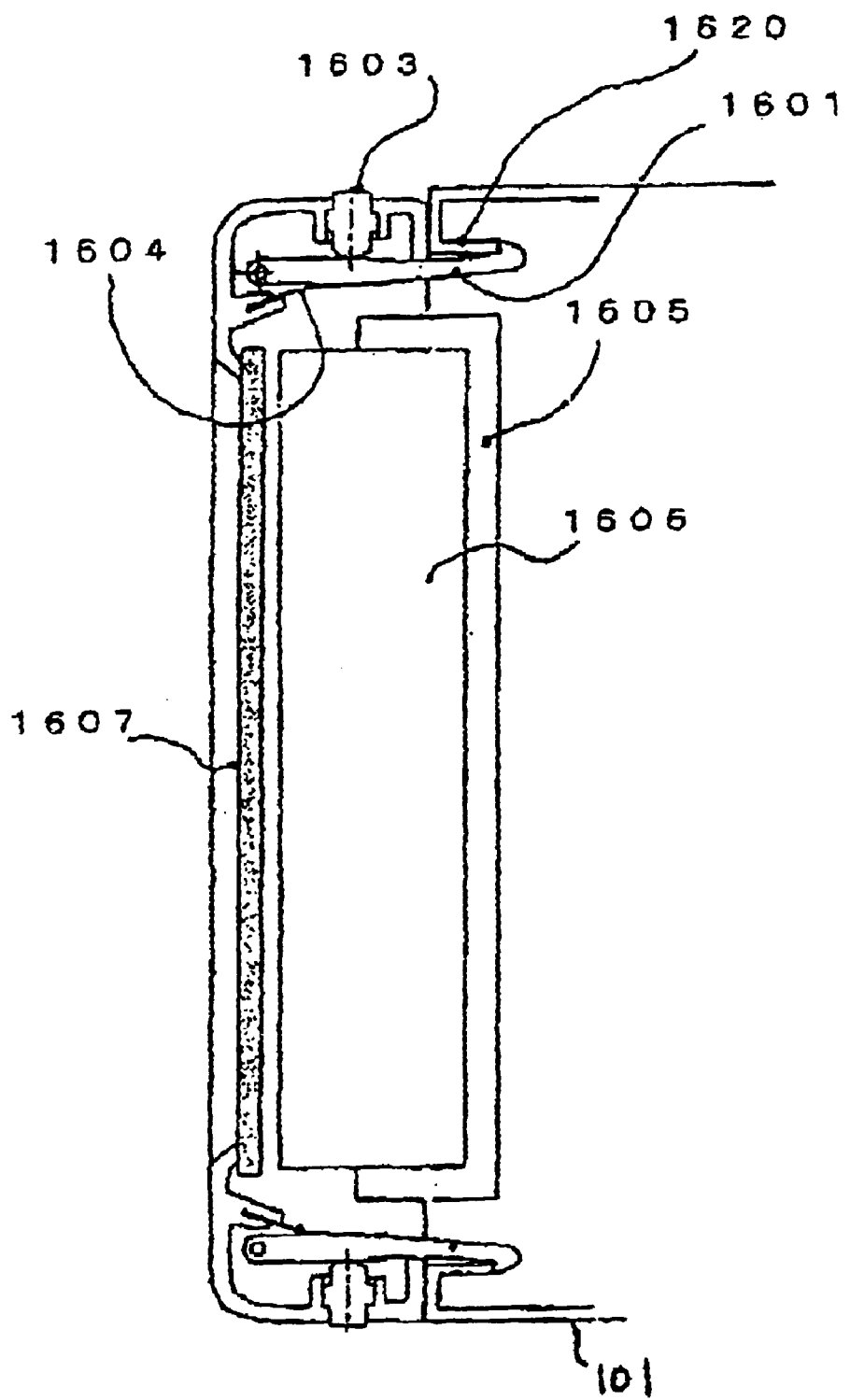
FIG. 24 is a cross-sectional view of the removable customer display unit of the sales transaction terminal device in accordance with the sixteenth embodiment of the present invention, taken along a line A—A of FIG. 23.
Figure 25:
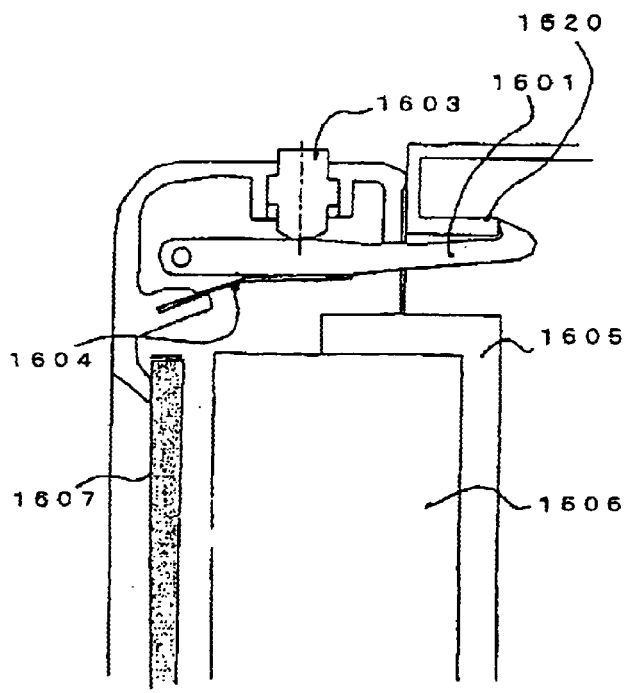
FIG. 25 is an enlarged cross-sectional view showing part of FIG. 24.

FIGS. 23 to 25 show a sales transaction terminal device in accordance with a sixteenth embodiment of the present invention. The sales transaction terminal device of the sixteenth embodiment is characterized in that a customer display unit 1607 is detachable from the terminal body 101.

The customer display unit 1607 comprises at least one release button 1603 which is depressed when the customer display unit 1607 is disengaged from the terminal body 101.

FIG. 24 is a cross-sectional view of the customer display unit 1607 taken along a line A—A of FIG. 23. The release button 1603 is provided at each side (i.e., right and left sides) of the customer display unit 1607. The release button 1603 is brought into contact with a hook 1601. The hook 1601 is rotatable about a pivot of the customer display unit body provided at a portion offset from the release button 1603 toward the operator side. The front end of the hook 1601 extends into the terminal body 101 and engages with an engaging portion 1620 formed in the terminal body 101. The hook 1601 is resiliently urged toward the release button 1603 so that the hook 1601 firmly engages with the engaging portion 1620.

When the release button 1603 is depressed, the hook 1601 rotates about the pivot against the resilient force of the spring 1604 and disengages from the engaging portion 1620. At the same time, a connector 1606 of the operator display unit 1607 disengages from a connector 1605 of the terminal body 101.

FIG. 25 is an enlarged view showing the above-described engaging structure of the customer display unit 1607.

Seventeenth Embodiment

Figure 27:
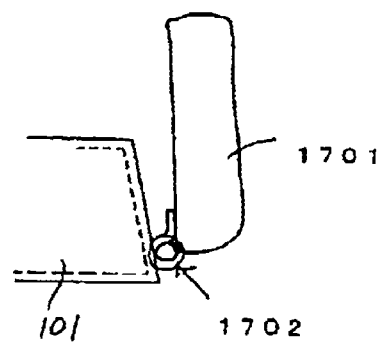
FIG. 27 is a side view showing an angular adjustment mechanism of the sales transaction terminal device in accordance with the seventeenth embodiment of the present invention.
Figure 26:
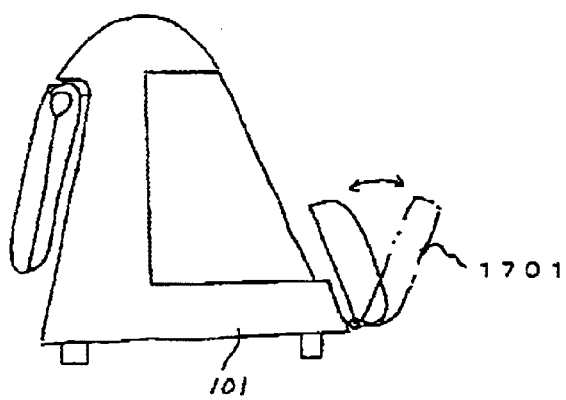
FIG. 26 is a side view showing a sales transaction terminal device in accordance with a seventeenth embodiment of the present invention.
Figure 28:
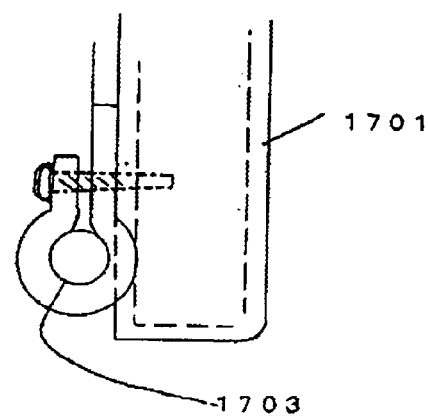
FIG. 28 is an enlarged view showing part of FIG. 27.

FIGS. 26 to 28 show a sales transaction terminal device in accordance with a seventeenth embodiment of the present invention. The sales transaction terminal device of the seventeenth embodiment is characterized in that the angle of a customer display unit 1701 is adjustable.

As shown in FIGS. 27 and 28, the customer display unit body 1701 is rotatably supported via a hinge member 1702 at the customer side of the terminal body 101. The hinge member 1702 includes a friction-type slide brake 1703 which holds the customer display unit body 1701 at an arbitrary angle. This arrangement allows each customer to optimize the angle of the customer display unit body 1701 according to the physical size or the height of a shop counter on which this terminal device is placed.

Eighteenth Embodiment

Figure 29A:
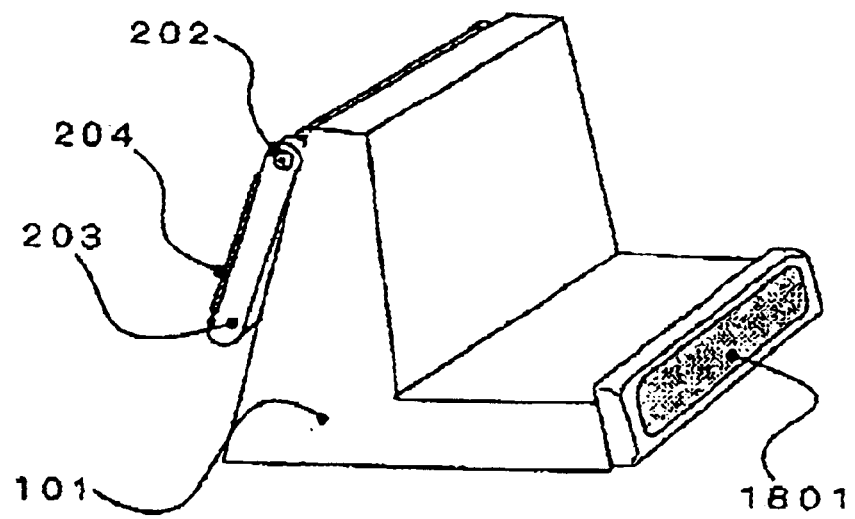
FIG. 29A is a perspective view showing a sales transaction terminal device in accordance with an eighteenth embodiment of the present invention.
Figure 29B:
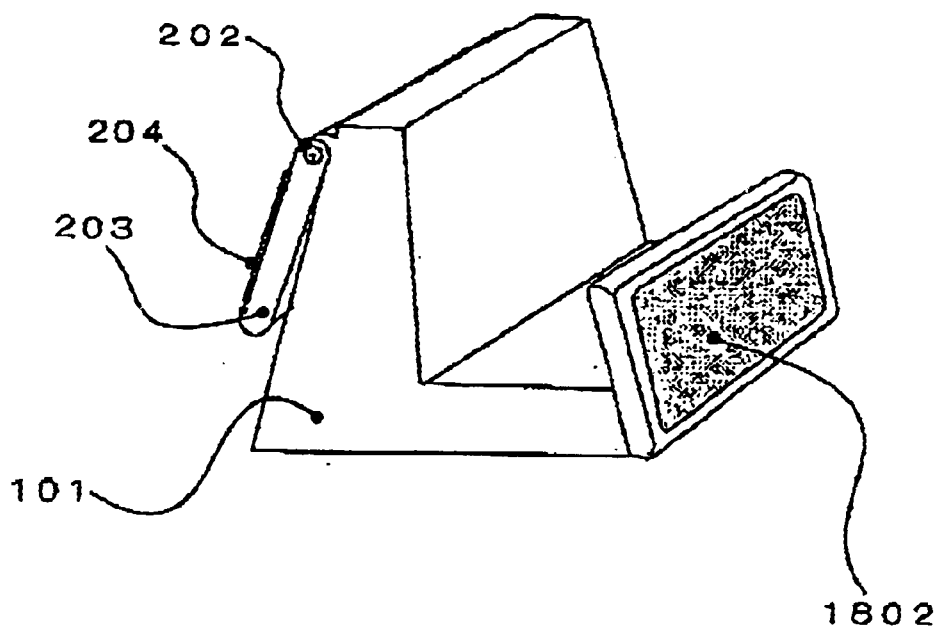
FIG. 29B is a perspective view showing another aspect of the sales transaction terminal device in accordance with the eighteenth embodiment of the present invention.

FIGS. 29A and 29B show a sales transaction terminal device in accordance with an eighteenth embodiment of the present invention. The sales transaction terminal device of the eighteenth embodiment is characterized in that the customer display unit is exchangeable between a small customer display unit 1801 (FIG. 29A) and a large customer display unit 1802 (FIG. 29B).

Nineteenth Embodiment

Figure 30A:
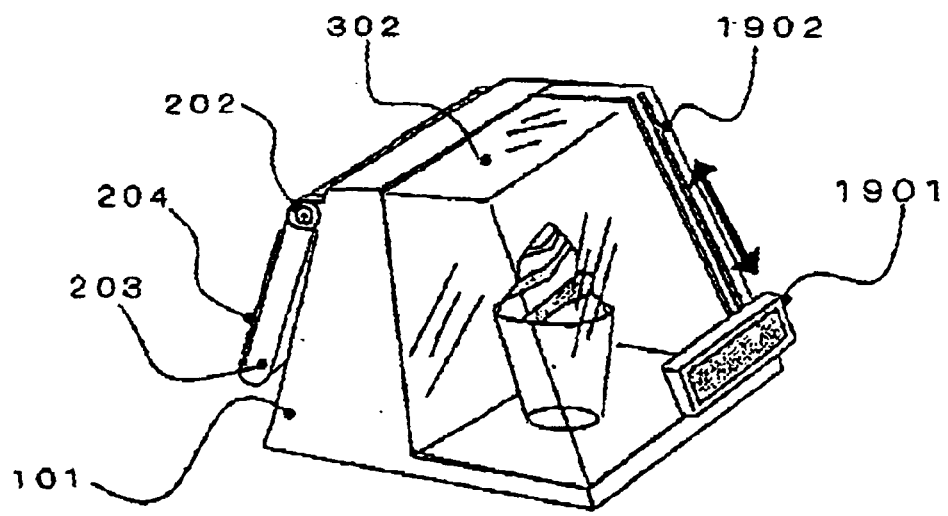
FIG. 30A is a perspective view showing a sales transaction terminal device in accordance with a ninth embodiment of the present invention.
Figure 30B:
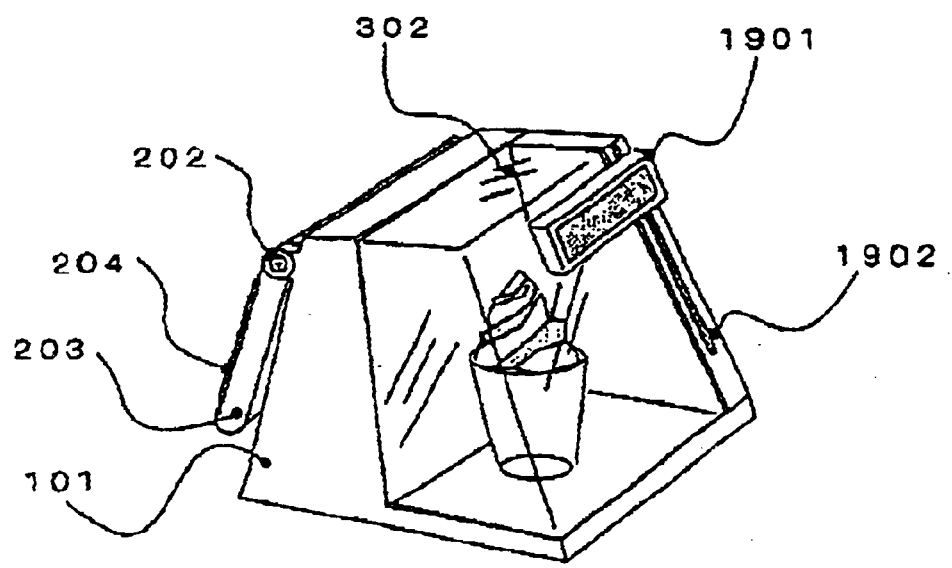
FIG. 30B is a perspective view showing another condition of the sales transaction terminal device in accordance with the ninth embodiment of the present invention.

FIGS. 30A and 30B show a sales transaction terminal device in accordance with a nineteenth embodiment of the present invention. The sales transaction terminal device of the nineteenth embodiment is characterized in that the vertical position (i.e., altitude) of a customer display unit 1901 is changeable from a lower position (FIG. 30A) to a higher position (FIG. 30B) or vice versa.

To this end, a slide rail 1902 is provided along a right (or left) peripheral edge of the cover casing 302 covering the exhibition spot. A slider (not shown) mounting the customer display unit 1901 slides along the slide rail 1902.

FIGS. 31A and 31B show a detailed arrangement of the slide mechanism employed in the nineteenth embodiment of the present invention. A guide slit 1920 extends in the vertical direction to guide the customer display unit 1901 in the up-and-down direction. An abrasion sheet 1914 is provided around the guide slit 1920. The customer display unit 1901 slides against a friction force of the abrasion sheet 1914 along the guide slit 1920.

The customer display unit 1901 has a roller 1912 at the bottom thereof. A rod or leaf spring 1913 is provided to give a resilient force to the roller 1912. In other words, the rod or leaf spring 1913 gives a depression force 1921 to the customer display unit 1901 so that the customer display unit 1901 is stationarily held on the surface of the abrasion sheet 1914 in an usual condition.

A customer gives a lift-up force 1922, in an opposed direction against the depressing force 1921, to the customer display unit 1901. In other words, a substantial depression force given to the customer display unit 1901 is reduced by an amount equal to the lift-up force 1922. Thus, the customer can easily slide the customer display unit 1901 along the guide slit 1920. A free end of a flexible cable 1926 is connected to the customer display unit 1901, while a base end of this flexible cable 1926 is connected to a power supply section and/or a control section (e.g., a microprocessor) housed in the terminal body.

Twentieth Embodiment

FIGS. 32A and 32B through FIGS. 34A and 34B show sales transaction terminal devices in accordance with a twentieth embodiment of the present invention. The sales transaction terminal device of the twentieth embodiment is characterized in that a flexible linkage is used to change the height, angle and position of a customer display unit with respect to a terminal body.

Figure 32A:
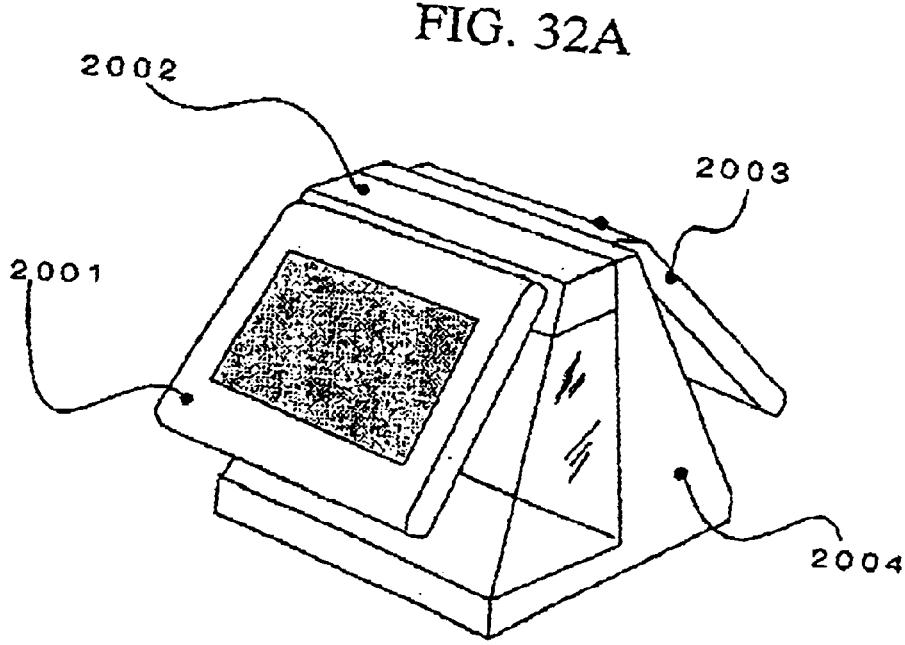
FIG. 32A is a perspective view showing a sales transaction terminal device in accordance with a twentieth embodiment of the present invention.
Figure 32B:
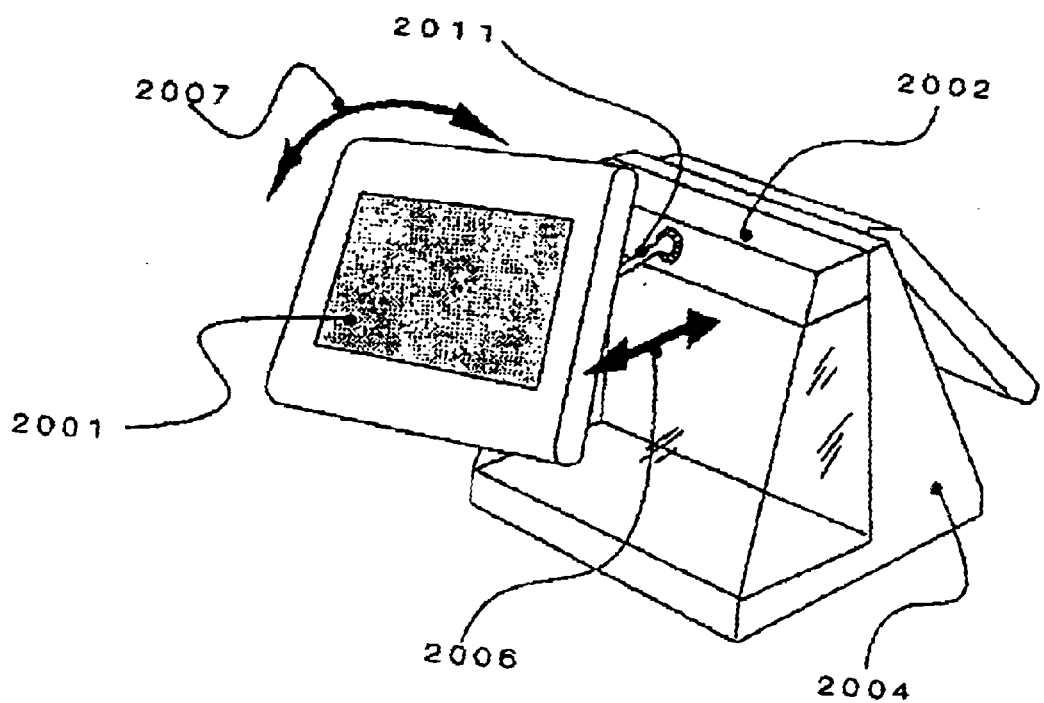
FIG. 32B is a perspective view showing an extended condition of the sales transaction terminal device shown in FIG. 32A.

FIGS. 32A and 32B show a sales transaction terminal devices having a customer display unit 2001 shiftable from a retracted position (FIG. 32A) to an extended position (FIG. 32B). The customer display unit 2001 is connected via a universal-joint equipped arm 2011 to a support body 2002 positioned above an exhibition spot provided at the customer side of a terminal body 2004. An operator display unit 2003 is provided at the operator side of the terminal body 2004.

Namely, by extending the universal-joint equipped arm 2011, the position of the customer display unit 2001 is changeable in the back-and-forth direction (refer to 2006). An angular adjustment of the customer display unit 2001 is performed by rotating the customer display unit 2001 (refer to 2007).

Figure 33:
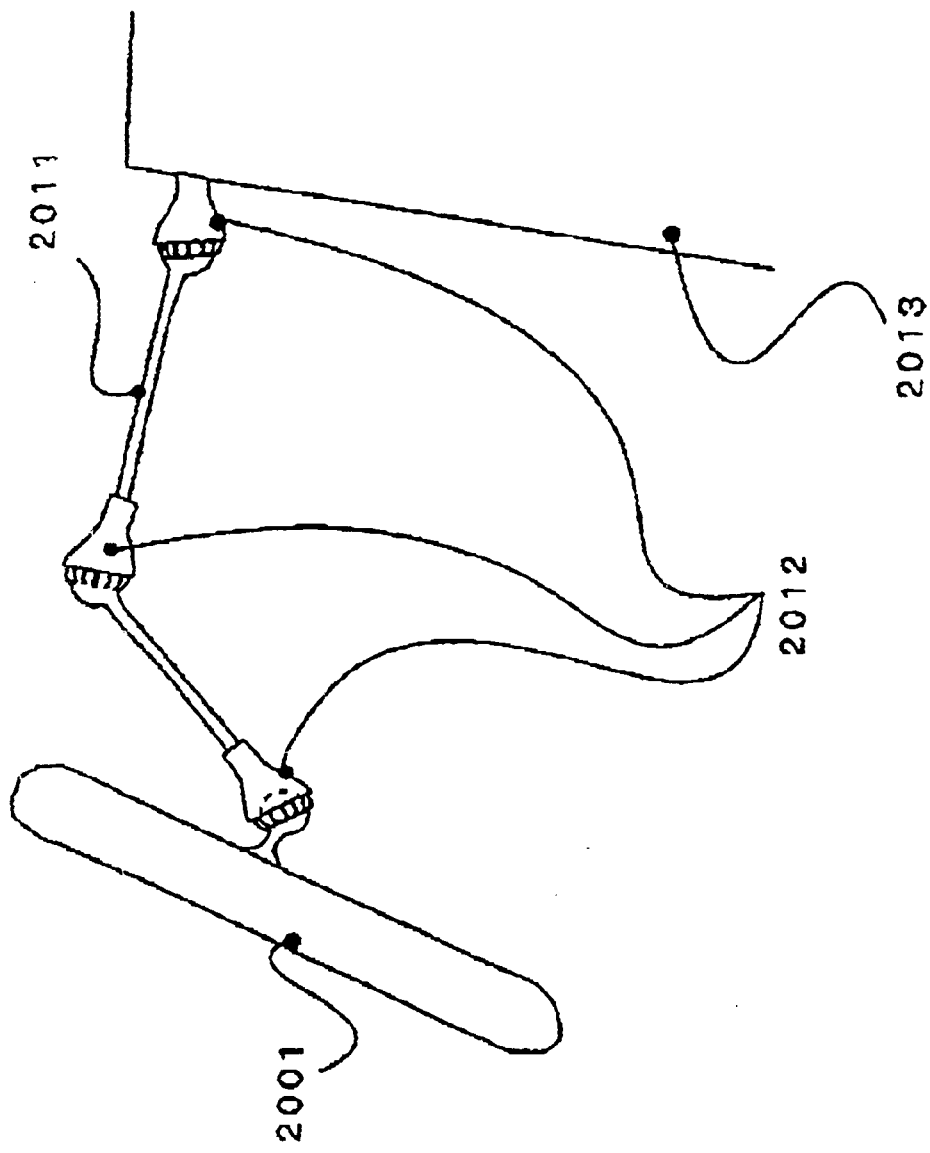
FIG. 33 is a side view showing another sales transaction terminal device in accordance with the twentieth embodiment of the present invention.

FIG. 33 shows another sales transaction terminal device which uses a plurality of universal-joint equipped arms 2011 which are interposed between the customer display unit 2001 and a terminal body 2013. A plurality of friction ball universal joints 2012 are used as nodes of the universal joint linkage. The arrangement of the universal joint linkage shown in FIG. 33 can change the position of the customer display unit 2001 in each of the back-and-forth, up-anddown, and right-and-left directions, as well as the angle and height of the customer display unit 2001.

Figure 34A:
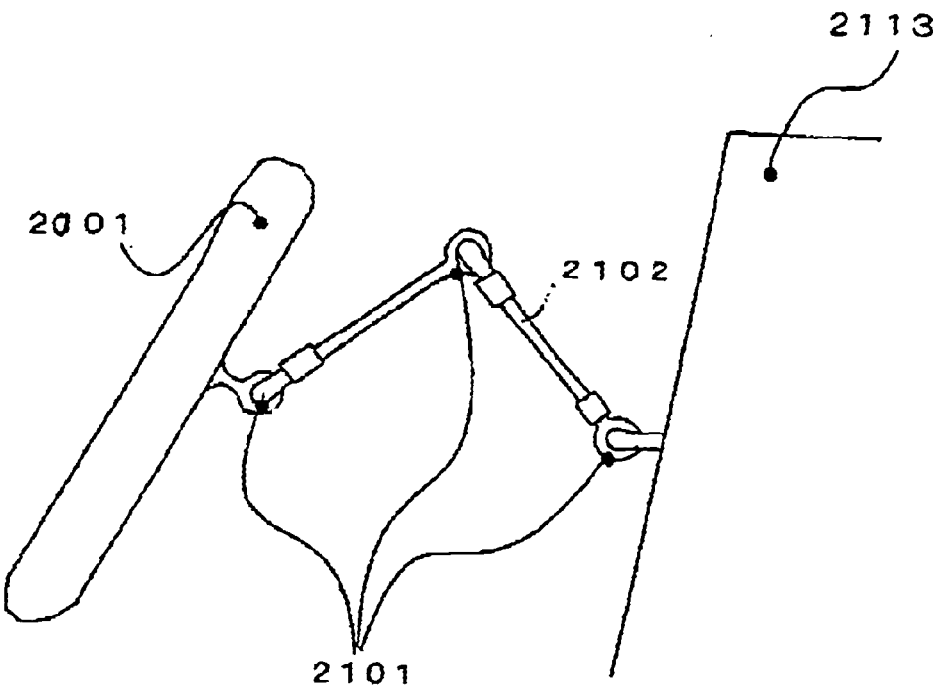
FIG. 34A is a side view showing still another sales transaction terminal device in accordance with the twentieth embodiment of the present invention.
Figure 34B:
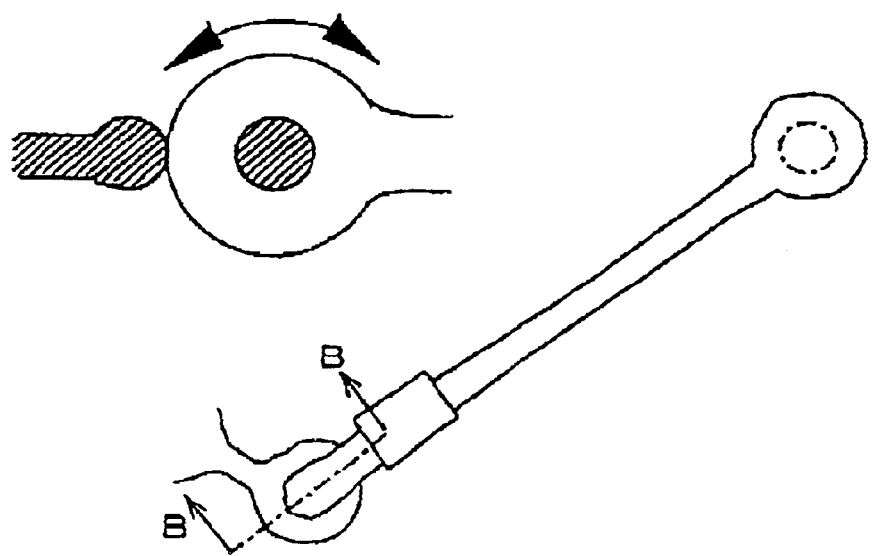
FIG. 34B is a side view showing a detailed arrangement of an elastic friction ring employed in the sales transaction terminal device shown in FIG. 34A.

FIGS. 34A and 34B show still another sales transaction terminal device which uses a plurality of arms 2102 linked (or coupled) via a plurality of elastic friction rings 2101 which are interposed between the customer display unit 2001 and a terminal body 2113. Each elastic friction ring 2101 serves as a node of the arm joint linkage. FIG. 34B shows an enlarged view of the elastic friction ring 2101 taken along a line B—B.

The arrangement of the arm joint linkage shown in FIGS. 34A and 34B can change the position of the customer display unit 2001 in each of the back-and-forth, up-and-down, and right-and-left directions, as well as the angle and height of the customer display unit 2001.

Twenty-first Embodiment

Figure 35:
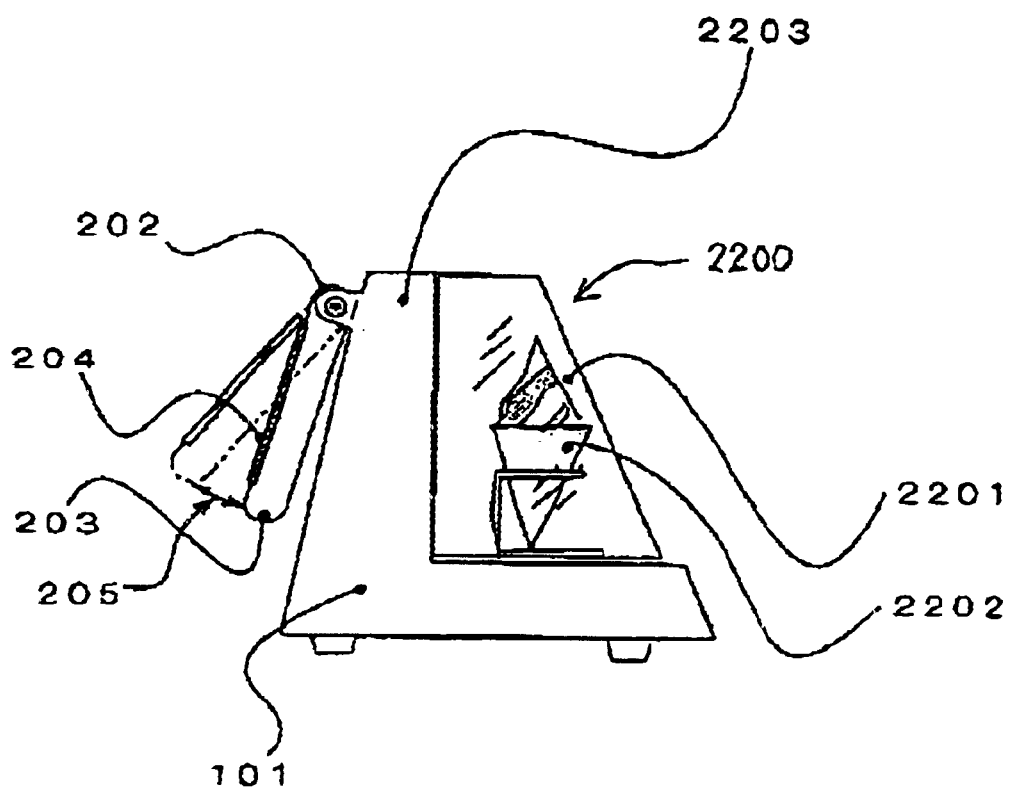
FIG. 35 is a side view showing a sales transaction terminal device in accordance with a twenty-first embodiment of the present invention.

FIG. 35 shows a sales transaction terminal device in accordance with a twenty-first embodiment of the present invention. The sales transaction terminal device of the twenty-first embodiment comprises a terminal body 101 configured into an L shape when seen from its side. The L-shaped terminal body 101 comprises an exhibition casing space 2200 provided at the customer side thereof or opened to the customer side so that customers can take a look at a commodity sample 2202 exhibited or displayed in a transparent cover casing 2201 placed in the exhibition casing space 2200.

An operator display unit 204, equipped with an ordinary touch panel, is provided at the operator side of the L-shaped terminal body 101. The operator can perform a sales transaction by manipulating this operator display unit 204 (i.e., by using the touch panel) when a customer places an order. A body 203 of the operator display unit 204 is rotatably hinged about a shaft 202 which extends horizontally and is provided at an upper part of the operator side of the L-shaped terminal body 101. Thus, the operator can adjust the angle of the operator display unit 204 within an angular zone 205 according to the physical size of each operator (i.e., the eye position of each operator).

In this manner, the sales transaction terminal device of the twenty-first embodiment comprises the terminal body 101 having an L-shaped configuration when seen from its side. The terminal body 101 has the exhibition casing space 2200 at the customer side thereof. A side view of the exhibition casing space 2200 corresponds to the L-shaped configuration. The operator display unit 204 is provided at the operator side of the terminal body 101.

Thus, the twenty-first embodiment of the present invention makes it possible to allow an operator to perform the sales transaction in a face-to-face manner at a shop counter where the sales transaction terminal device is placed. Furthermore, the twenty-first embodiment makes it possible to utilize the front part of the L-shaped terminal body 101 as a useful space for various guidance and customer service exhibitions, such as commodity sample display, advertizing display, menu display or sales price list display.

Twenty-second Embodiment

Figure 36A:
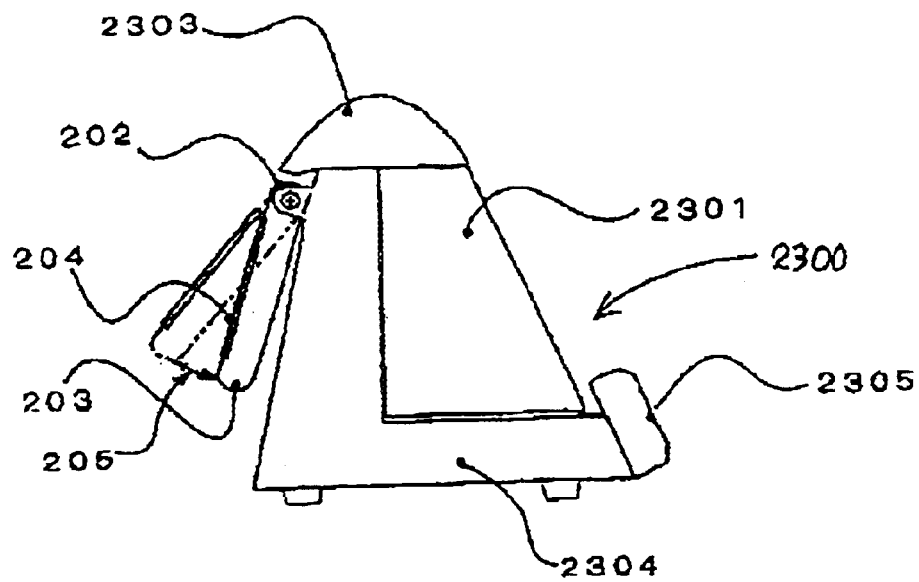
FIG. 36A is a side view showing a sales transaction terminal device in accordance with a twenty-second embodiment of the present invention.
Figure 36B:
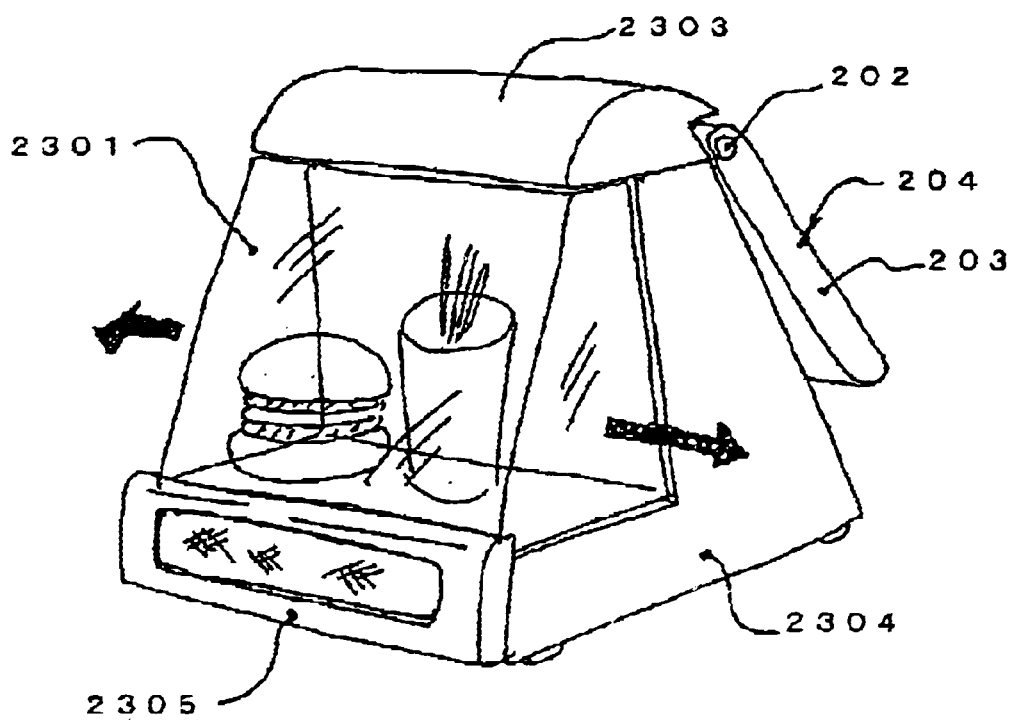
FIG. 36B is a perspective view showing the sales transaction terminal device in accordance with the twenty-second embodiment of the present invention.

FIGS. 36A and 36B show a sales transaction terminal device in accordance with a twenty-second embodiment of the present invention. The sales transaction terminal device of the twenty-second embodiment is characterized in that a transparent cover casing 2301 facing to the customer side is slidable in a right-and-left direction.

A transparent exhibition casing space 2300 is provided at the customer side of an L-shaped terminal body 2304. A top body 2303 is provided on the L-shaped terminal body 2304. A customer display unit 2305 is provided at the front end of the customer side of the L-shaped terminal body 2304 which is closer to customers.

The top body 2303 extends toward the customer side beyond a customer-side wall of a vertically extending portion of the L-shaped terminal body 2304.

The customer display unit 2305 extends upward beyond an upper surface of a horizontally extending portion of the L-shaped terminal body 2304.

The top body 2303 and the customer display unit 2305 cooperatively hold the cover casing 2301 placed in the exhibition casing space 2300 while allowing the cover casing 2301 to slide in the right-and-left direction.

Thus, the twenty-second embodiment makes it possible to prevent the cover casing 2301 from going out toward the customer side.

Furthermore, the cover casing 2301 is smoothly removed off the terminal body 2304 by sliding the cover casing 2301. With this arrangement, the commodity samples in the cover casing 2301 can be flexibly exchanged.

Twenty-third Embodiment

FIGS. 37A to 37C show a sales transaction terminal device in accordance with a twenty-third embodiment of the present invention. The sales transaction terminal device of the twenty-third embodiment comprises an exhibition casing space 2400 provided at the customer side of an L-shaped terminal body 2403. A top body 2406 is provided on the L-shaped terminal body 2403. A customer display unit 2401 is provided at the front end of the customer side of the L-shaped terminal body 2403 which is closer to customers.

The top body 2406 extends toward the customer side beyond a customer-side wall of a vertically extending portion of the L-shaped terminal body 2403.

The customer display unit 2401 extends upward beyond an upper surface of a horizontally extending portion of the L-shaped terminal body 2403.

The top body 2406 and the customer display unit 2401 cooperatively hold a transparent cover casing 2405 placed in the exhibition casing space 2400 while allowing the cover casing 2405 to slide in the right-and-left direction.

The cover casing 2405 has a projection 2410 at a behind side thereof. The projection 2410 is engageable with a recess 2411 formed on the customer-side wall of the vertically extending portion of the L-shaped terminal body 2403.

A lower slide guide 2420 is provided on the upper surface of the horizontally extending portion of the L-shaped terminal body 2403. An upper slide guide 2430 is provided on a bottom surface of the top body 2406. Both the slide guides 2420 and 2430 extend in the right-and-left direction to guide the cover casing 2405 in a direction normal to a customer-side direction facing to a customer.

The cover casing 2405 is made of a transparent resin material which is elastically deformable slightly.

In an insertion of the cover casing 2405 into the exhibition casing space 2400, the cover casing 2405 slides along the slide guides 2420 and 2430 while elastically deforming due to the projection 2410 sliding on a flat portion of the customer-side wall of the L-shaped terminal body 2403. When the projection 2410 falls into the mating recess 2411, the slide movement of the cover casing 2405 is stopped and the cover casing 2405 is released from the elastic deformation and is held in a locked condition.

In this manner, the twenty-third embodiment of the present invention makes it possible to realize a slide-in and click-stop mechanism for the slidable cover casing 2405.

Twenty-fourth Embodiment

Figure 38A:
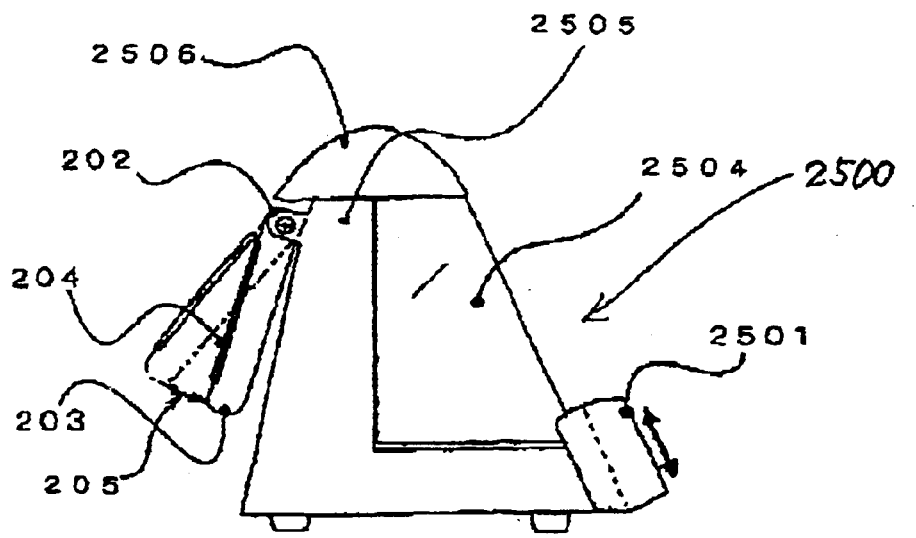
FIG. 38A is a side view showing a sales transaction terminal device in accordance with a twenty-fourth embodiment of the present invention.
Figure 38B:
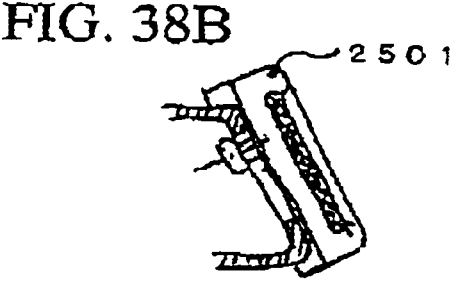
FIG. 38B (cross-sectional) and FIG. 38C (perspective) are views cooperatively showing details of a slide mechanism for a customer display unit employed in the sales transaction terminal device in accordance with the twenty-fourth embodiment of the present invention.
Figure 38C:
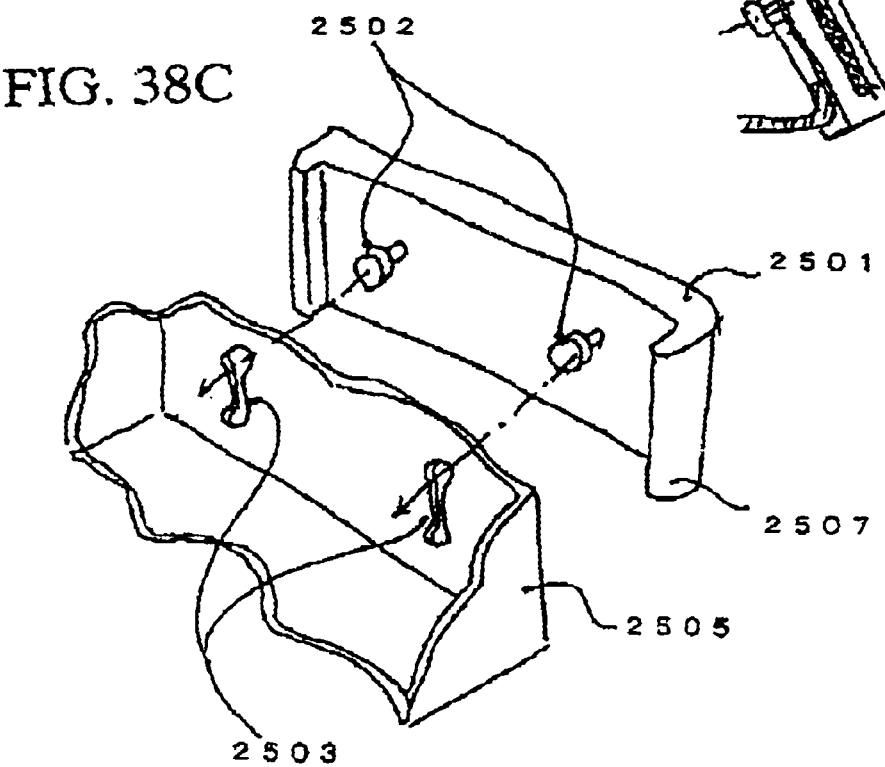

FIGS. 38A to 38C show a sales transaction terminal device in accordance with a twenty-fourth embodiment of the present invention. The sales transaction terminal device of the twenty-fourth embodiment comprises an exhibition casing space 2500 provided at the customer side of an L-shaped terminal body 2505. A top body 2506 is provided on the L-shaped terminal body 2505. A customer display unit 2501 is provided at the front end of the customer side of the L-shaped terminal body 2505 which is closer to customers.

The top body 2506 extends toward the customer side beyond a customer-side wall of a vertically extending portion of the L-shaped terminal body 2505.

The customer display unit 2501 extends upward beyond an upper surface of a horizontally extending portion of the L-shaped terminal body 2505.

The customer display unit 2501 is slidable in an up-and-down direction along a surface of the L-shaped terminal body 2505.

The customer display unit 2501 has a bent portion 2507, bending toward the operator side, at each of right and left ends thereof. Each bent portion 2507, when fixed to the front end of the customer side of the L-shaped terminal body 2505, serves as a stopper for preventing the cover casing 2504 from sliding in the right-and-left direction.

More specifically, when the customer display unit 2501 is slid downward along the surface of the L-shaped terminal body 2505, the top of the customer display unit 2501 becomes lower than the upper surface of the horizontally extending portion of the L-shaped terminal body 2505. Thus, the cover casing 2504 is removable at the customer side. In other words, the commodity samples in the cover casing 2504 can be flexibly exchanged from the customer side.

FIG. 38B is a cross-sectional view showing the customer display unit 2501 which is slidable in the up-and-down direction. FIG. 38C is a perspective view showing a slide mechanism for the customer display unit 2501. A pair of slide guide projections 2502 are provided on the behind side of the customer display unit 2501. A pair of guide holes 2503, each elongated in the up-and-down direction, are provided on the front end surface of the customer side of the L-shaped terminal body 2505. The slide guide projections 2502 of the customer display unit 2501 are slidable along the corresponding guide holes 2503, so that the customer display unit 2501 can shift in the up-and-down direction.

Twenty-fifth Embodiment

Figure 39A:
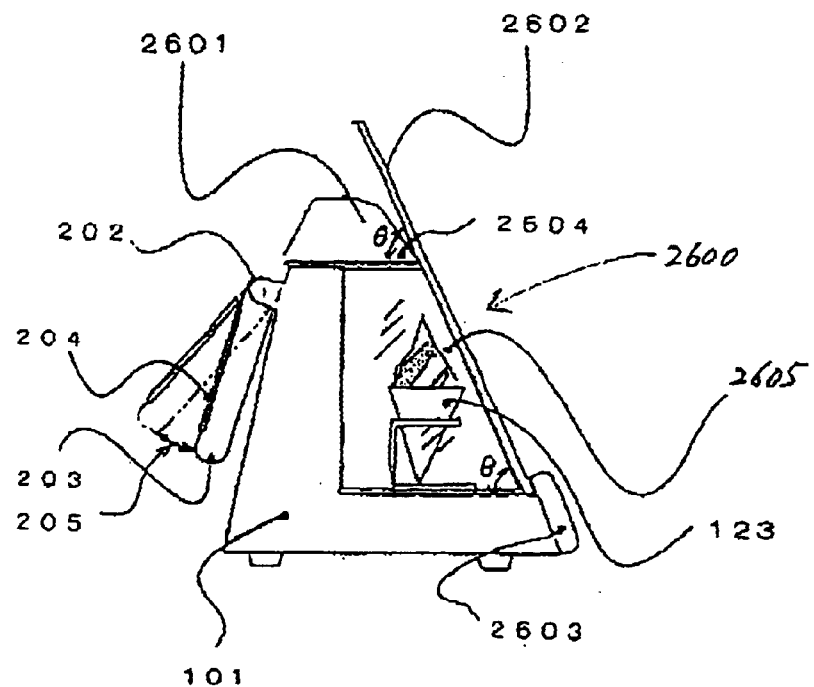
FIG. 39A is a side view showing a sales transaction terminal device in accordance with a twenty-fifth embodiment of the present invention.
Figure 39B:
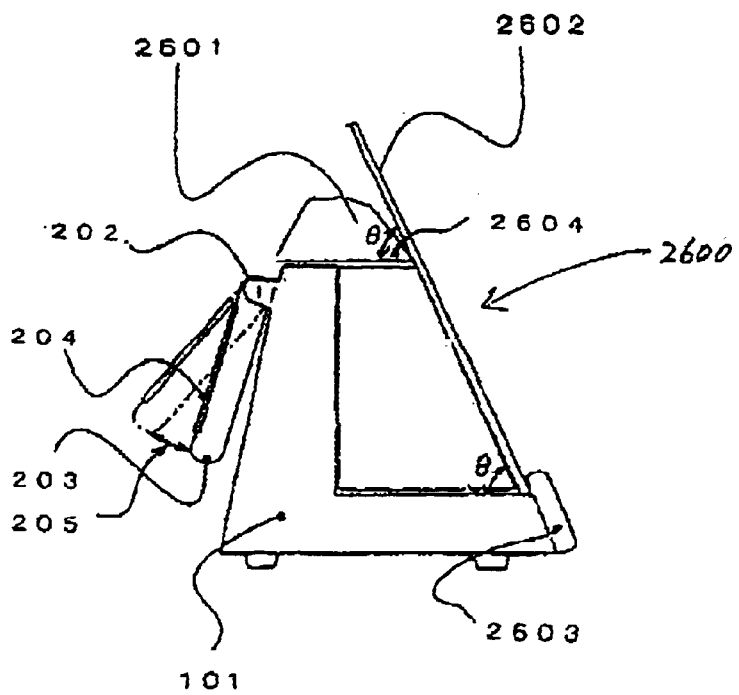
FIG. 39B is a side view showing another sales transaction terminal device in accordance with the twenty-fifth embodiment of the present invention.

FIGS. 39A and 39B show sales transaction terminal devices in accordance with a twenty-fifth embodiment of the present invention. The sales transaction terminal device of the twenty-fifth embodiment has an exhibition casing space 2600 provided at the customer side of an L-shaped terminal body 101. A top body 2601 is provided on the L-shaped terminal body 101. A customer display unit 2603 is provided at the front end of the customer side of the L-shaped terminal body 101 which is closer to customers.

The customer display unit 2603 extends upward beyond an upper surface of a horizontally extending portion of the L-shaped terminal body 101, so that the lower end of a POP advertisement plate 2602 is firmly held (i.e., sandwiched) between the behind side of the customer display unit 2603 and a transparent cover casing 2605.

The top body 2601 has a protruding portion 2604 extending toward the customer side. The protruding portion 2604 supports an upper portion of the POP advertisement plate 2602 which inclines along a customer-side surface of the cover casing 2605 at an angle θ.

The POP advertisement plate 2602 is used for displaying commodity pictures, price listing, catchphrases, etc.

FIG. 39B is a modification of the sales transaction terminal device which differs from the one shown in FIG. 39A in that the transparent cover casing 2605 is omitted.

The POP advertisement plate 2602 is held at the inclined angle θ. The lower end of the POP advertisement plate 2602 is stopped by the corner formed by the behind side of the customer display unit 2603 and the upper surface of the horizontally extending portion of the L-shaped terminal body 101. The upper portion of the POP advertisement plate 2602 is supported by the protruding portion 2604. The protruding length of the protruding portion 2604 is determined so that the inclined angle of the POP advertisement plate 2602 becomes θ.

According to the arrangement of the twenty-fifth embodiment, it becomes possible to effectively use the sales transaction terminal device for holding an advertisement plate or the like without requiring any special space.

Twenty-sixth Embodiment

Figure 40A:
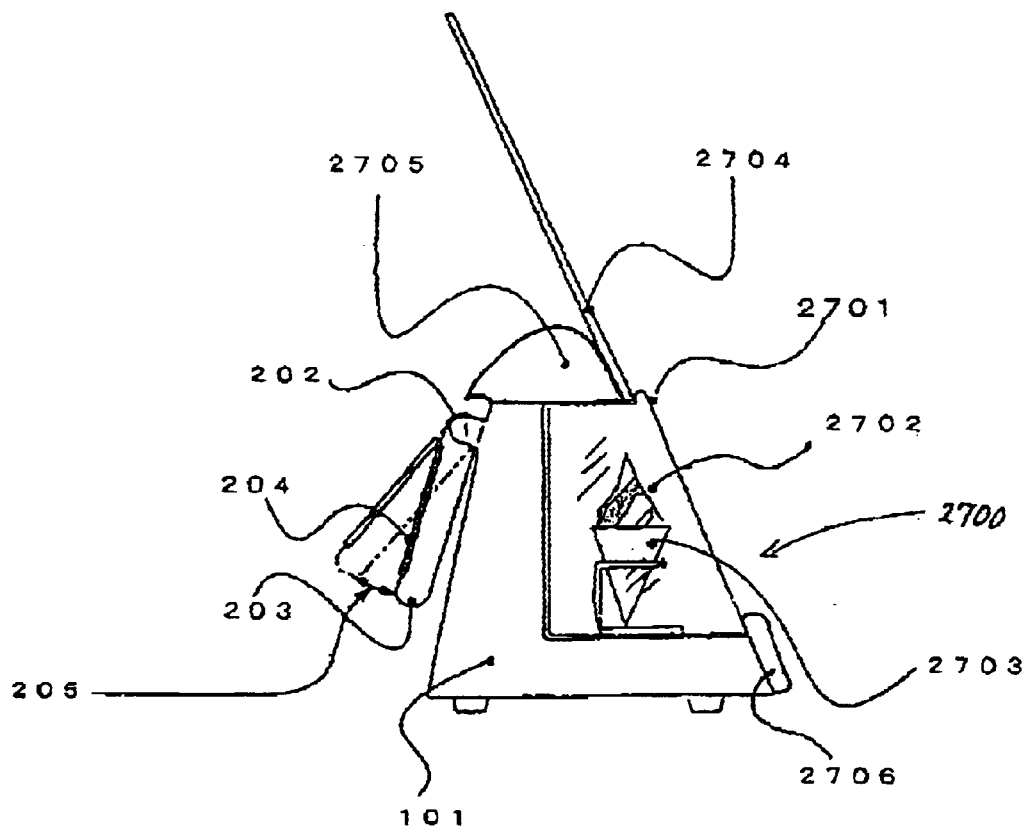
FIG. 40A is a side view showing a sales transaction terminal device in accordance with a twenty-sixth embodiment of the present invention.
Figure 40B:
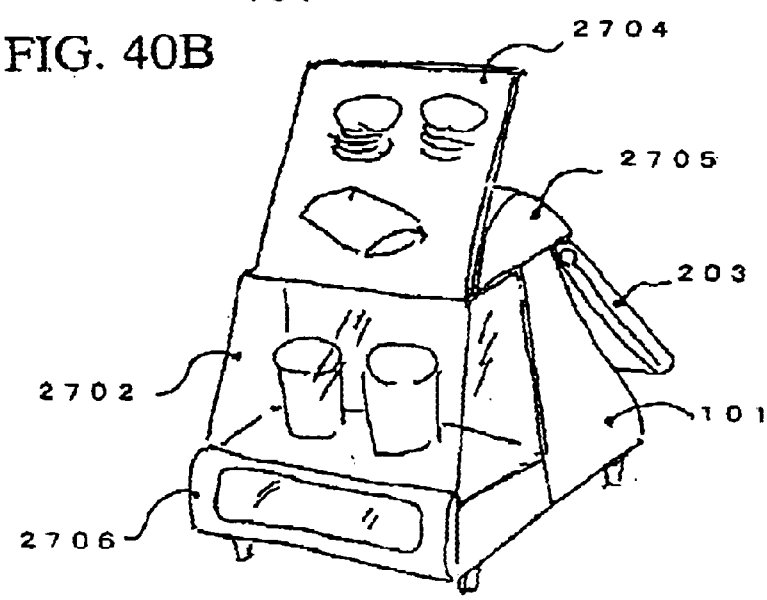
FIG. 40B is a perspective view showing the sales transaction terminal device in accordance with a twenty-sixth embodiment of the present invention.

FIGS. 40A and 40B show a sales transaction terminal device in accordance with a twenty-sixth embodiment of the present invention. The sales transaction terminal device of the twenty-sixth embodiment has an exhibition casing space 2700 provided at the customer side of an L-shaped terminal body 101. A top body 2705 is provided on the L-shaped terminal body 101. A customer display unit 2706 is provided at the front end of the customer side of the L-shaped terminal body 101 which is closer to customers.

A transparent cover casing 2702, placed in the exhibition casing space 2700, has a protruding portion 2701 which extends upward with an inclination angle identical with that of a customer-side surface of the cover casing 2702.

The top body 2705 and the protruding portion 2701 of the cover casing 2702 cooperate to firmly hold a POP advertisement plate 2704 therebetween. A customer side of the top body 2705 is formed into an inclined surface on which the POP advertisement plate 2704 leans.

The customer display unit 2706 is slidable in the up-and-down direction so that a commodity sample 2703 can be exchanged at the customer side as explained in the twenty-fourth embodiment.

In this manner, this embodiment makes it possible to effectively use a space between the upper edge of the cover casing 2702 and the top body 2705 for placing the POP advertisement plate 2704 which is preferably used for performing the sales transaction in a face-to-face manner.

Twenty-seventh Embodiment

Figure 41A:
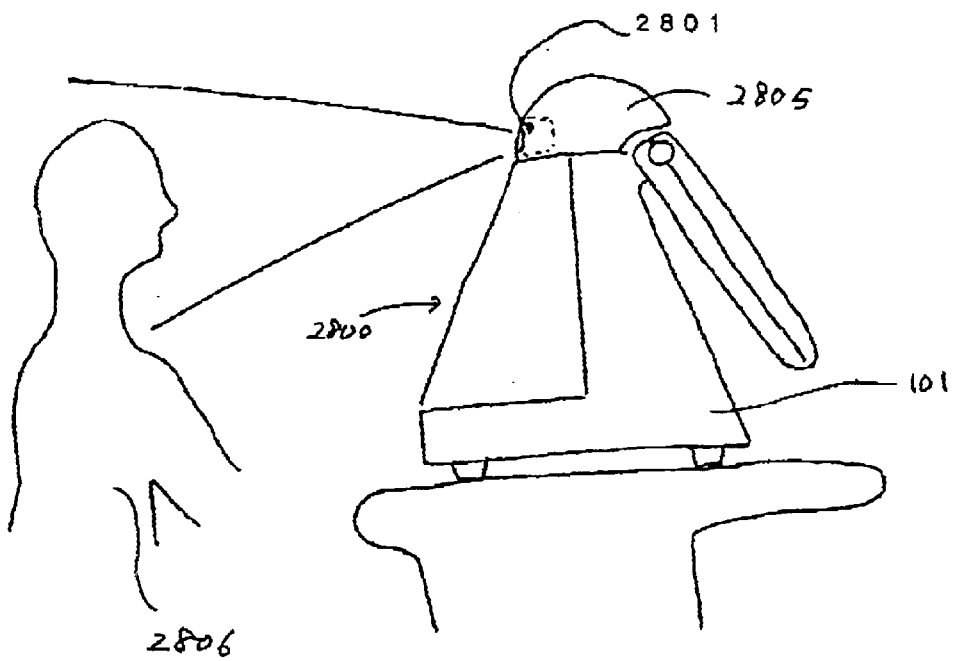
FIG. 41A is a side view showing a sales transaction terminal device in accordance with a twenty-seventh embodiment of the present invention.
Figure 41B:
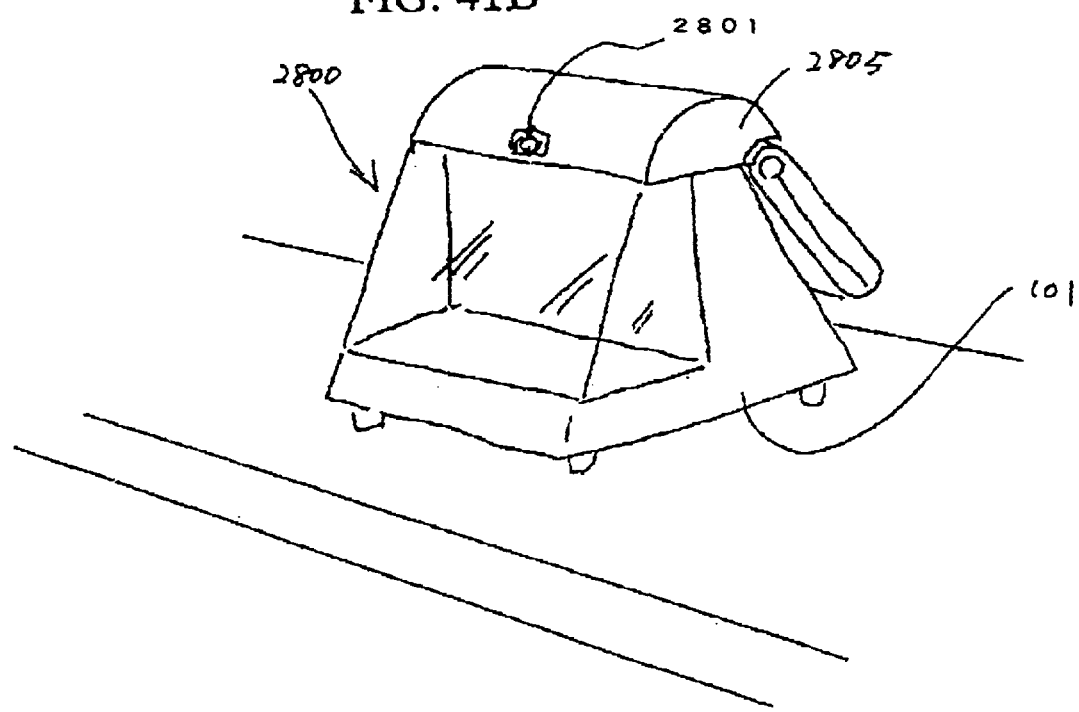
FIG. 41B is a perspective view showing the sales transaction terminal device in accordance with the twenty-seventh embodiment of the present invention.
Figure 44:
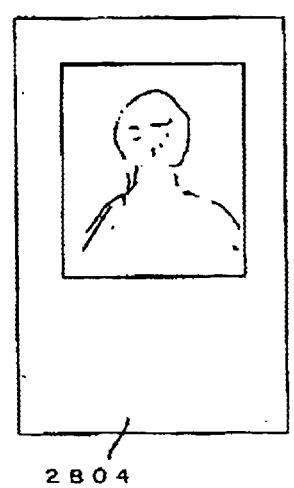
FIG. 44 is a view showing a special note produced from the printer associated with the sales transaction terminal device in accordance with the twenty-seventh embodiment of the present invention.

FIGS. 41A–41B to 44 show a sales transaction terminal device in accordance with a twenty-seventh embodiment of the present invention. The sales transaction terminal device of the twenty-seventh embodiment has an exhibition spot 2800 provided at the customer side of an L-shaped terminal body 101. A top body 2805 is provided on the L-shaped terminal body 101. A small camera (e.g., an electronic still camera or a small video camera) 2801 is placed on a customer-side surface of the top body 2805, so that the camera 2801 can take a photo of a customer 2806 standing in front of the sales transaction terminal device.

Figure 42:
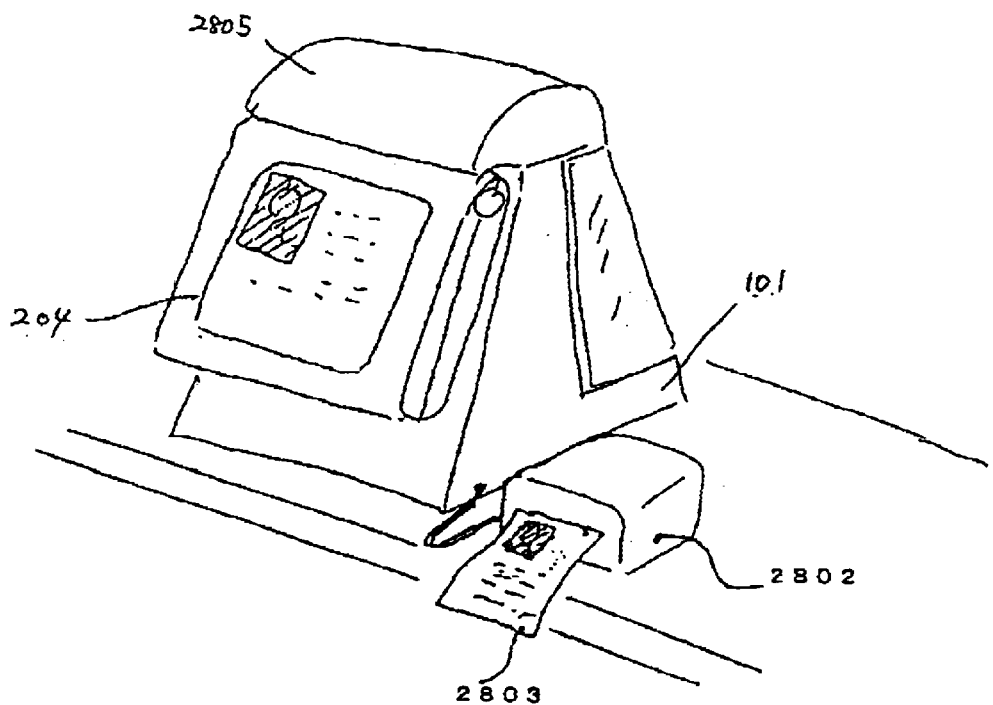
FIG. 42 is a perspective view showing the operator side of the sales transaction terminal device and an associated printer in accordance with the twenty-seventh embodiment of the present invention.
Figure 43:
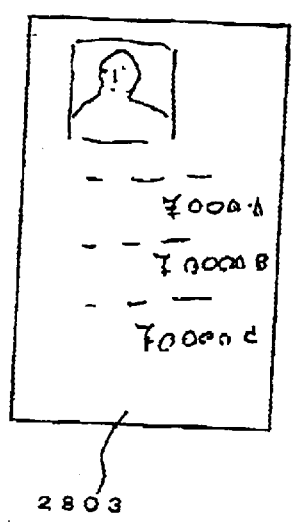
FIG. 43 is a view showing a receipt produced from the printer associated with the sales transaction terminal device in accordance with the twenty-seventh embodiment of the present invention.

As shown in FIG. 42, a printer (e.g., a digital printer) 2802 is connected to the terminal body 101. The printer 2802 produces a receipt 2803 (refer to FIG. 43) or any other special note 2804 (refer to FIG. 44) which includes a monochrome or color photo of a customer printed thereon upon a request from the customer.

In this case, the image of a photographed customer is displayed on a screen of an operator display unit 204. The image of each photographed customer is stored in a video memory (not shown) in the sales transaction terminal.

Twenty-eighth Embodiment

Figure 45:
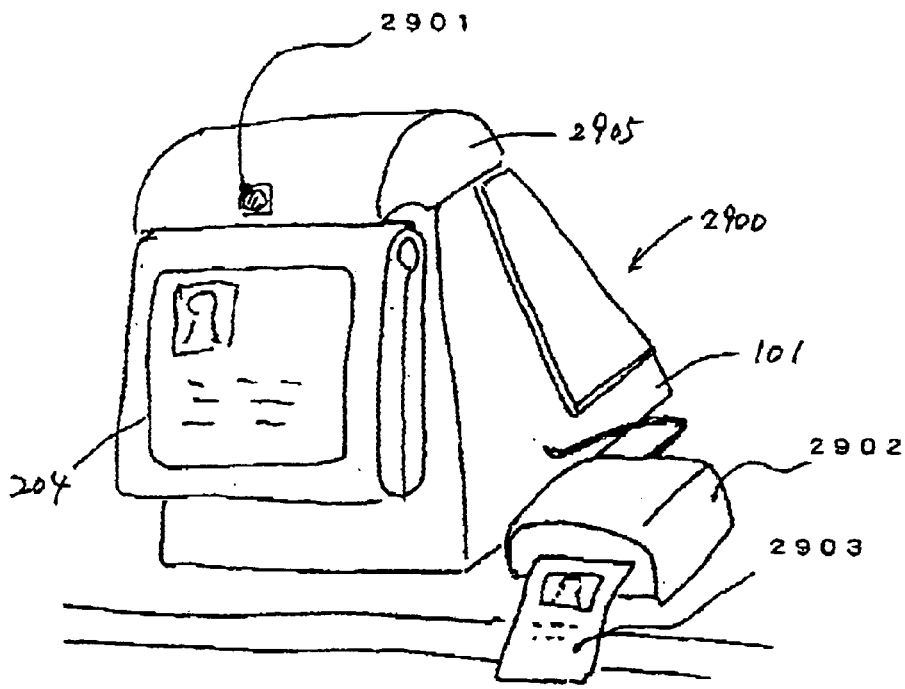
FIG. 45 is a perspective view showing the operator side of a sales transaction terminal device and an associated printer in accordance with a twenty-eighth embodiment of the present invention.
Figure 46:
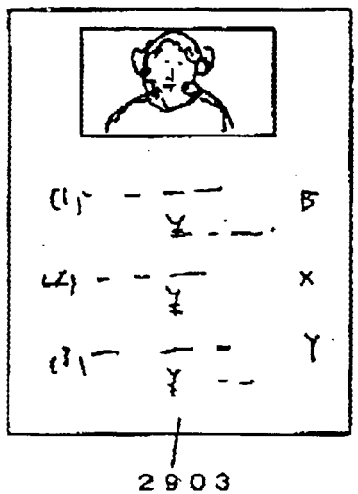
FIG. 46 is a view showing a receipt produced from the printer associated with the sales transaction terminal device in accordance with the twenty-eighth embodiment of the present invention.
Figure 47:
FIG. 47 is a view showing a special note produced from the printer associated with the sales transaction terminal device in accordance with the twenty-eighth embodiment of the present invention.

FIGS. 45 to 47 show a sales transaction terminal device in accordance with a twenty-eighth embodiment of the present invention. The sales transaction terminal device of the twenty-eighth embodiment has an exhibition spot 2900 provided at the customer side of an L-shaped terminal body 101. A top body 2905 is provided on the L-shaped terminal body 101. A small camera (e.g., an electronic still camera or a small video camera) 2901 is placed on an operator-side surface of the top body 2905, so that the camera 2901 can take a photo of a customer standing in front of the sales transaction terminal device.

A printer (e.g., a digital printer) 2902 is connected to the terminal body 101. The printer 2902 produces a receipt 2903 or any other special note 2904 which includes a monochrome or color photo of an operator printed thereon.

An operator display unit 204 displays an image of the receipt 2903 including an operator's photo.

This embodiment makes it possible to give a receipt or any other note as a shopping memorial which belongs to a new customer service style.

Twenty-ninth Embodiment

Figure 48:
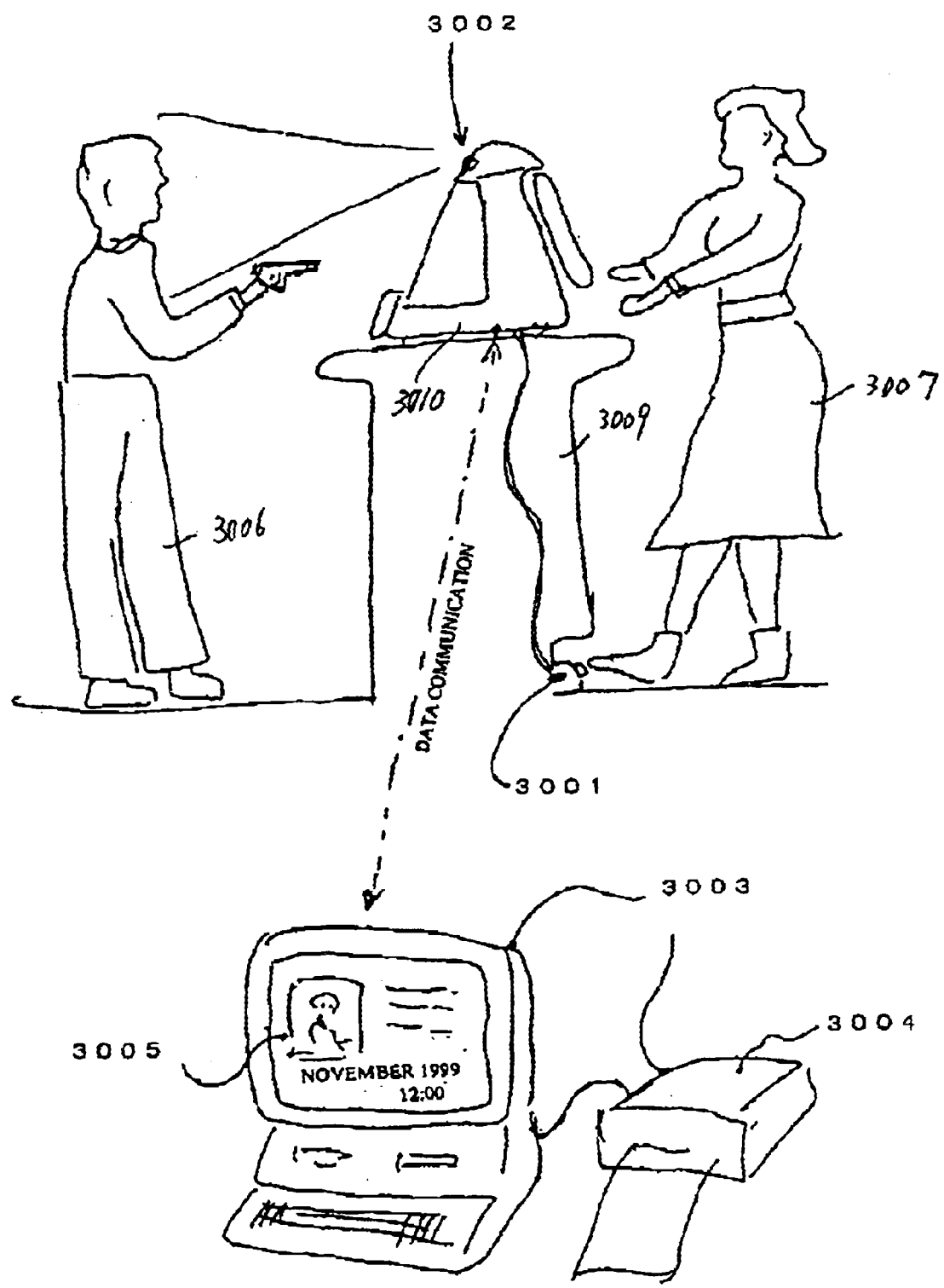
FIG. 48 is a view showing a sales transaction terminal device in accordance with a twenty-ninth embodiment of the present invention.
Figure 49:
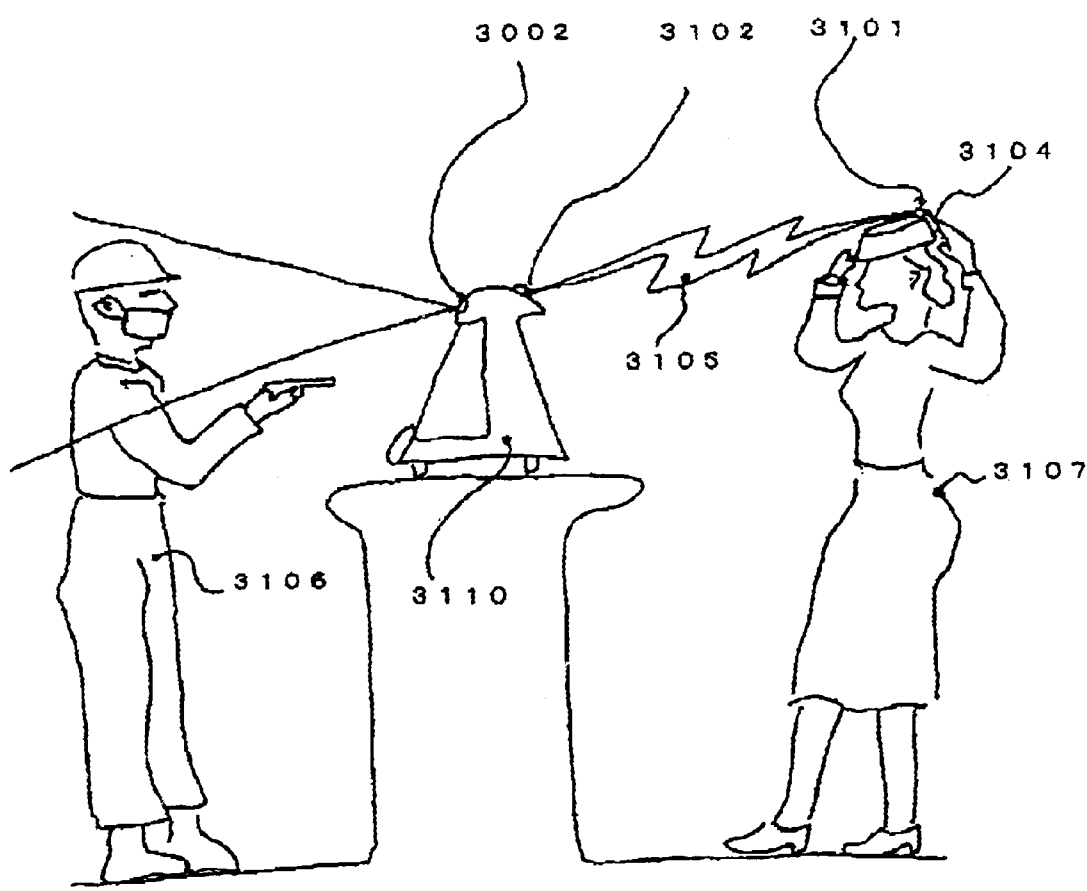
FIG. 49 is a view showing another sales transaction terminal device in accordance with the twenty-ninth embodiment of the present invention.

FIGS. 48 to 49 show sales transaction terminal devices in accordance with a twenty-ninth embodiment of the present invention. A sales transaction terminal device shown in FIG. 48 is a modification of the sales transaction terminal device shown in FIG. 41A to 44 and is different in that a small camera 3002 provided on the customer side of a terminal body 3010 is operable by an emergency foot switch 3001. The emergency foot switch 3001 is placed in a foot area of an operator 3007 inside a shop counter 3009.

For example, the operator 3007 can depress the emergency foot switch 3001 by her (or his) foot when the operator 3007 encounters with a suspicious man 3006.

The sales transaction terminal device performs data communications with a computer 3005 by wireless (or cable). The computer 3005 is located in a security administrating office (not shown) far outside of this shop. The image of the suspicious man 3006 photographed by the small camera 3002 is transmitted to the computer 3005. A printer (e.g., digital printer) 3004, connected to the computer 3005, produces a printed photo of the suspicious man 3006. In other words, the computer 3005 and the printer 3004 cooperatively act as a security data storing system 3003.

A sales transaction terminal device shown in FIG. 49 is a modification of the sales transaction terminal device shown in FIG. 48 and is different in that the emergency foot switch 3001 is replaced by an emergency touch switch 3104 attached to an ordinary wearing thing, e.g., a cap, a pocket, or a belt, of an operator 3107.

The small camera 3002 provided on the customer side of a terminal body 3110 is operable by the touch switch 3104 by wireless. More specifically, the touch switch 3104 is associated with a wireless communication unit 3101 which performs wireless data communication 3105 with a wireless communication unit 3102 provided on the terminal body 3110. For example, the operator 3107 can depress the touch switch 3104 by her (or his) finger when the operator 3107 encounters with a suspicious man 3106.

Thirtieth Embodiment

Figure 50A:
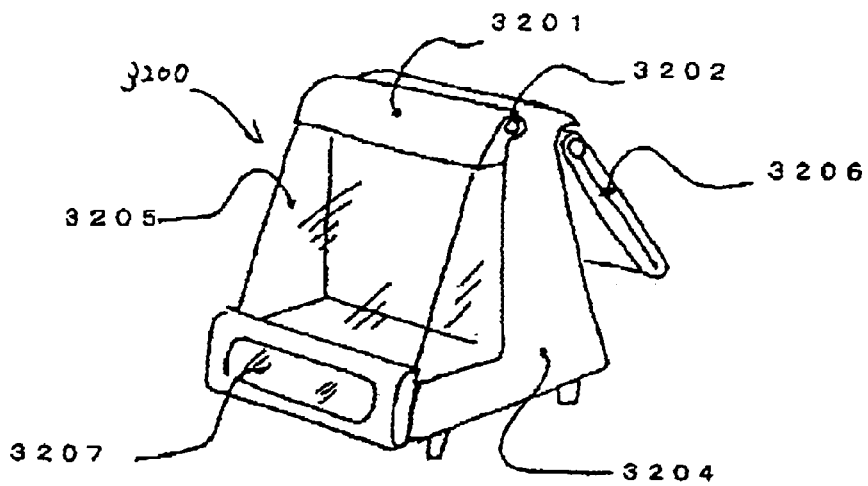
FIG. 50A is a perspective view showing a sales transaction terminal device in accordance with a thirtieth embodiment of the present invention.
Figure 50B:
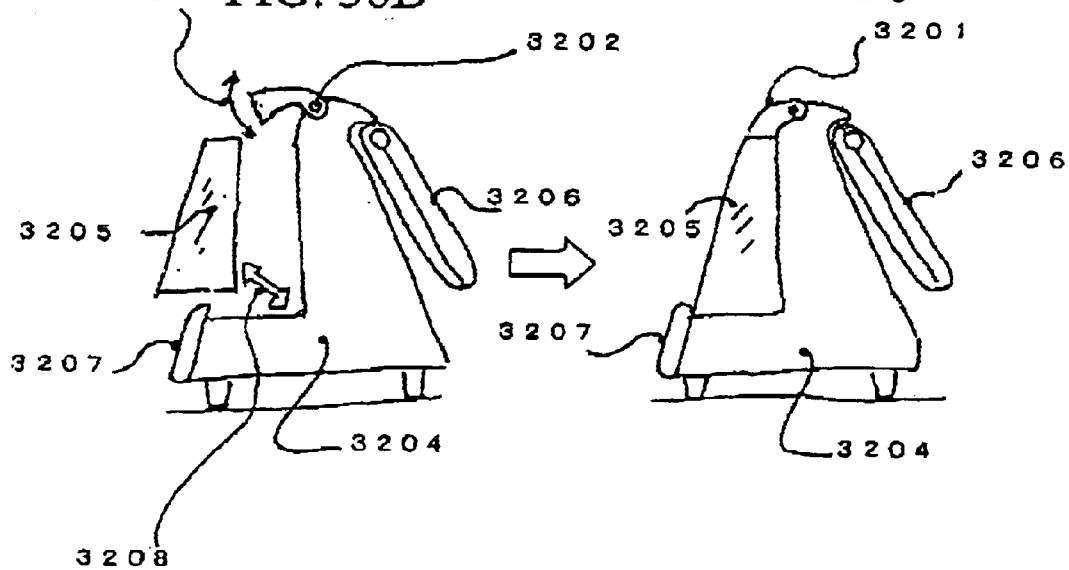
FIGS. 50B and 50C are side views showing a disengaging/engaging mechanism for a cover casing employed in the sales transaction terminal device in accordance with the thirtieth embodiment of the present invention.
Figure 50C:
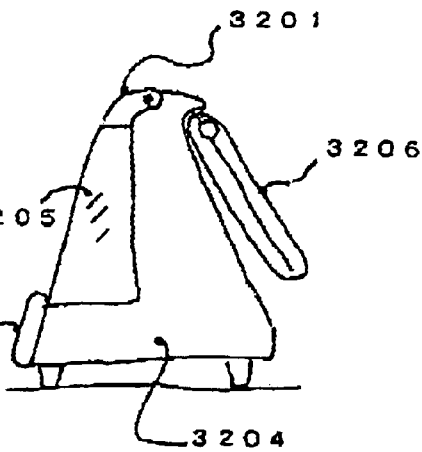

FIGS. 50A to 50C show a sales transaction terminal device in accordance with a thirtieth embodiment of the present invention. The sales transaction terminal device of the thirtieth embodiment is characterized in that a top body 3201 is rotatable.

An exhibition casing space 3200 is provided at the customer side of an L-shaped terminal body 3204. A customer display unit 3207 is provided at the front end of the customer side of the L-shaped terminal body 3204 which is closer to customers. The top body 3201 is provided on the L-shaped terminal body 3204, and is rotatably supported about a hinge member 3202 provided at the upper portion of the customer side of the L-shaped terminal body 3204. An operator display unit 3206 is rotatably supported at the operator side of the L-shaped terminal body 3204.

The customer display unit 3207 extends upward beyond an upper surface of a horizontally extending portion of the L-shaped terminal body 3204.

The top body 3201 is swingable between a closed position and an opened position.

When the top body 3201 is in the closed position, the top body 3201 and the customer display unit 3207 cooperatively hold a transparent cover casing 3205 placed in the exhibition casing space 3200.

When the top body 3201 is in the opened condition, the thirtieth embodiment allows an operator to remove the cover casing 3205 at the customer side (refer to an arrow 3208).

Namely, when the cover casing 3205 is removed, the top body 3201 is swung upward about the hinge member 3202 as shown by an arrow 3203 in FIG. 50B.

On the other hand, when the cover casing 3205 is placed in the exhibition casing space 3200, the top body 3201 is swung downward about the hinge member 3202 to lock the exhibition casing 3205 as shown in FIG. 50C.

Thirty-first Embodiment

Figure 51A:
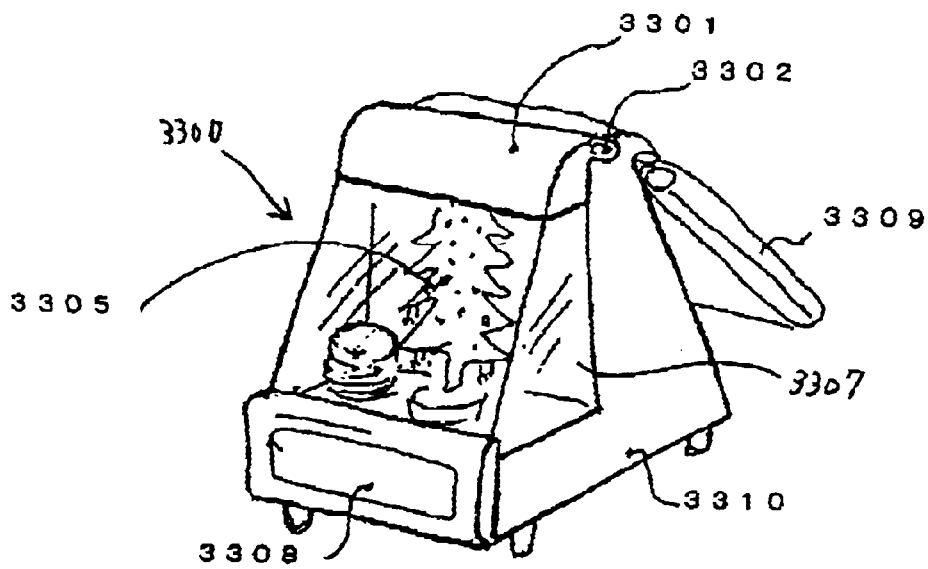
FIG. 51A is a perspective view showing a sales transaction terminal device in accordance with a thirty-first embodiment of the present invention.
Figure 51B:
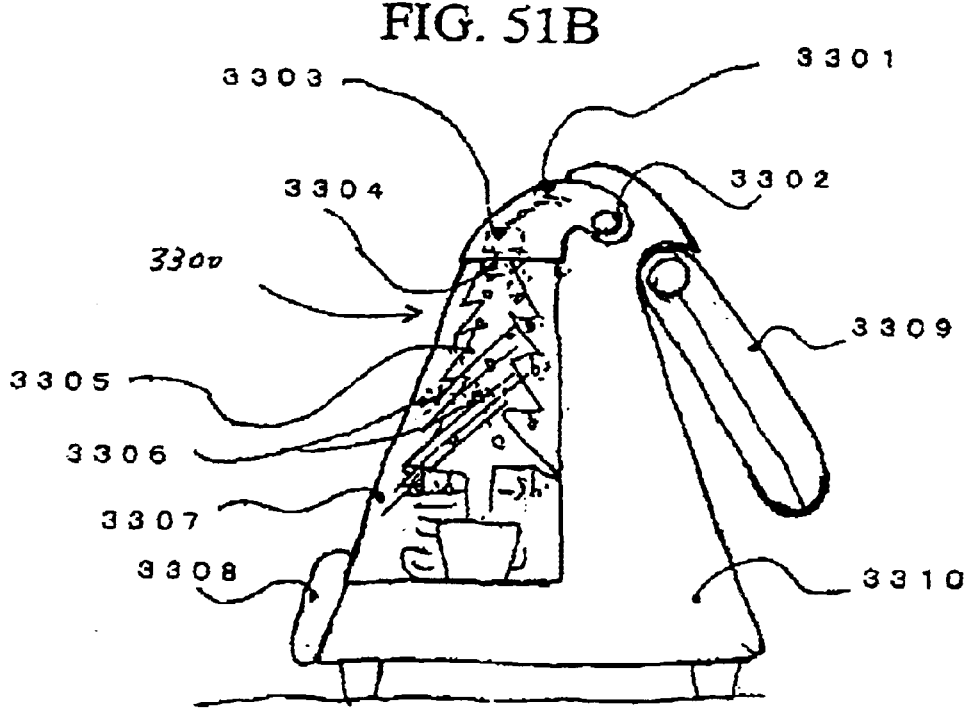
FIG. 51B is a side view showing the sales transaction terminal device in accordance with the thirty-first embodiment of the present invention.

FIGS. 51A and 51B show a sales transaction terminal device in accordance with a thirty-first embodiment of the present invention. The sales transaction terminal device of the thirty-first embodiment is characterized in that electric power supply is feasible in the exhibition casing space.

An exhibition casing space 3300 is provided at the customer side of an L-shaped terminal body 3310. A customer display unit 3308 is provided at the front end of the customer side of the L-shaped terminal body 3310 which is closer to customers. A top body 3301 is provided on the L-shaped terminal body 3310, and is rotatably supported about a hinge member 3302 provided at the upper portion of the customer side of the L-shaped terminal body 3310. An operator display unit 3309 is rotatably supported at the operator side of the L-shaped terminal body 3310.

The customer display unit 3308 extends upward beyond an upper surface of a horizontally extending portion of the L-shaped terminal body 3310.

The top body 3301 is swingable between a closed position and an opened position.

When the top body 3301 is in the closed position, the top body 3301 and the customer display unit 3308 cooperatively hold a transparent cover casing 3307 placed in the exhibition casing space 3300.

When the top body 3301 is in the opened condition, the thirty-first embodiment allows an operator to remove the cover casing 3307 at the customer side.

An exhibition object 3305 in the cover casing 3307 may be an electric good which requires electric power supply.

The top body 3301 conceals (or accommodates) connectors 3303 and 3304 necessary for electric power supply. The connector 3303 is connected to a power line (and a signal line) extending from the inside of the terminal body 3310. The connector 3304 is connected to a power line (and a signal line) of lamps 3306 decorating the exhibition object 3305 in the cover casing 3307.

Thirty-second Embodiment

Figure 52A:
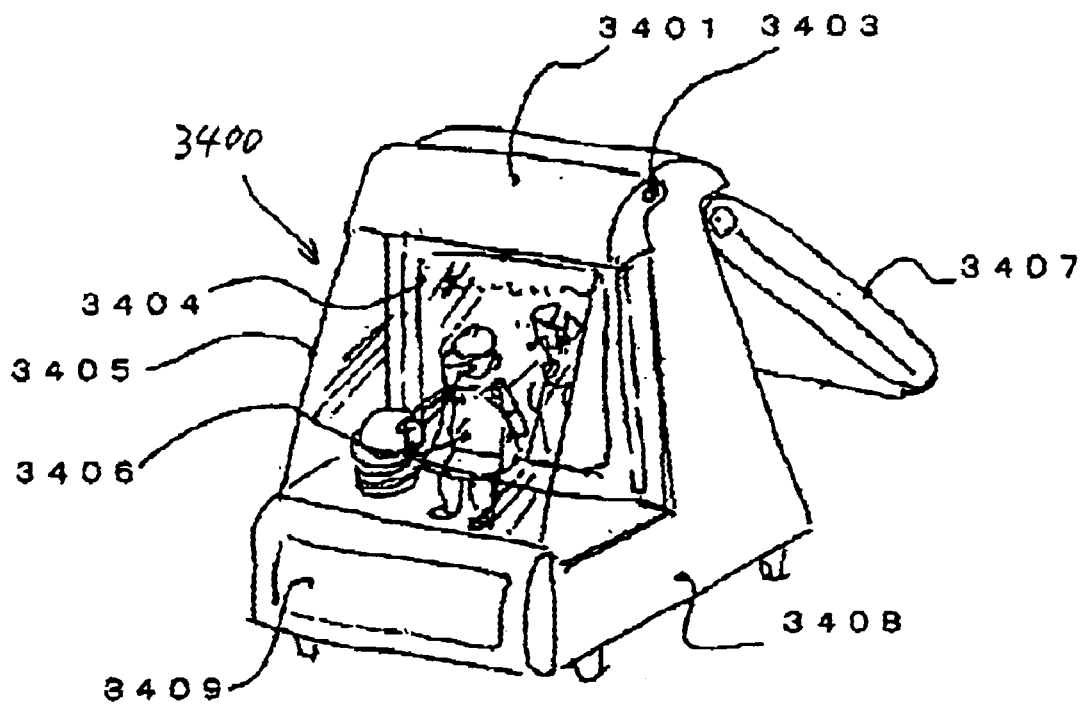
FIG. 52A is a perspective view showing a sales transaction terminal device in accordance with a thirty-second embodiment of the present invention.
Figure 52B:
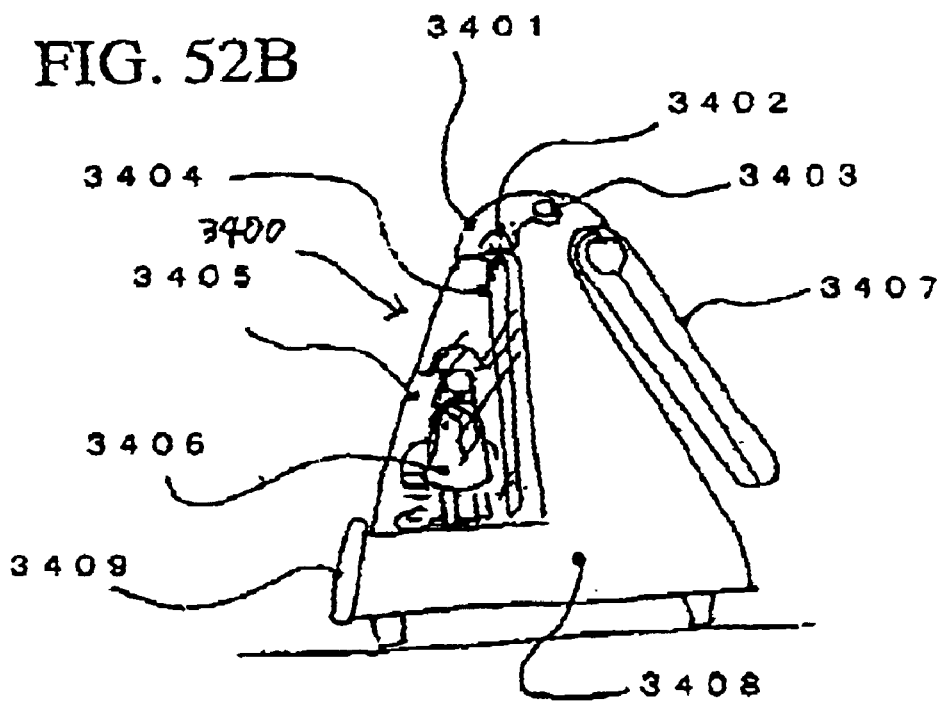
FIG. 52B is a side view showing the sales transaction terminal device in accordance with the thirty-second embodiment of the present invention.
Figure 53:
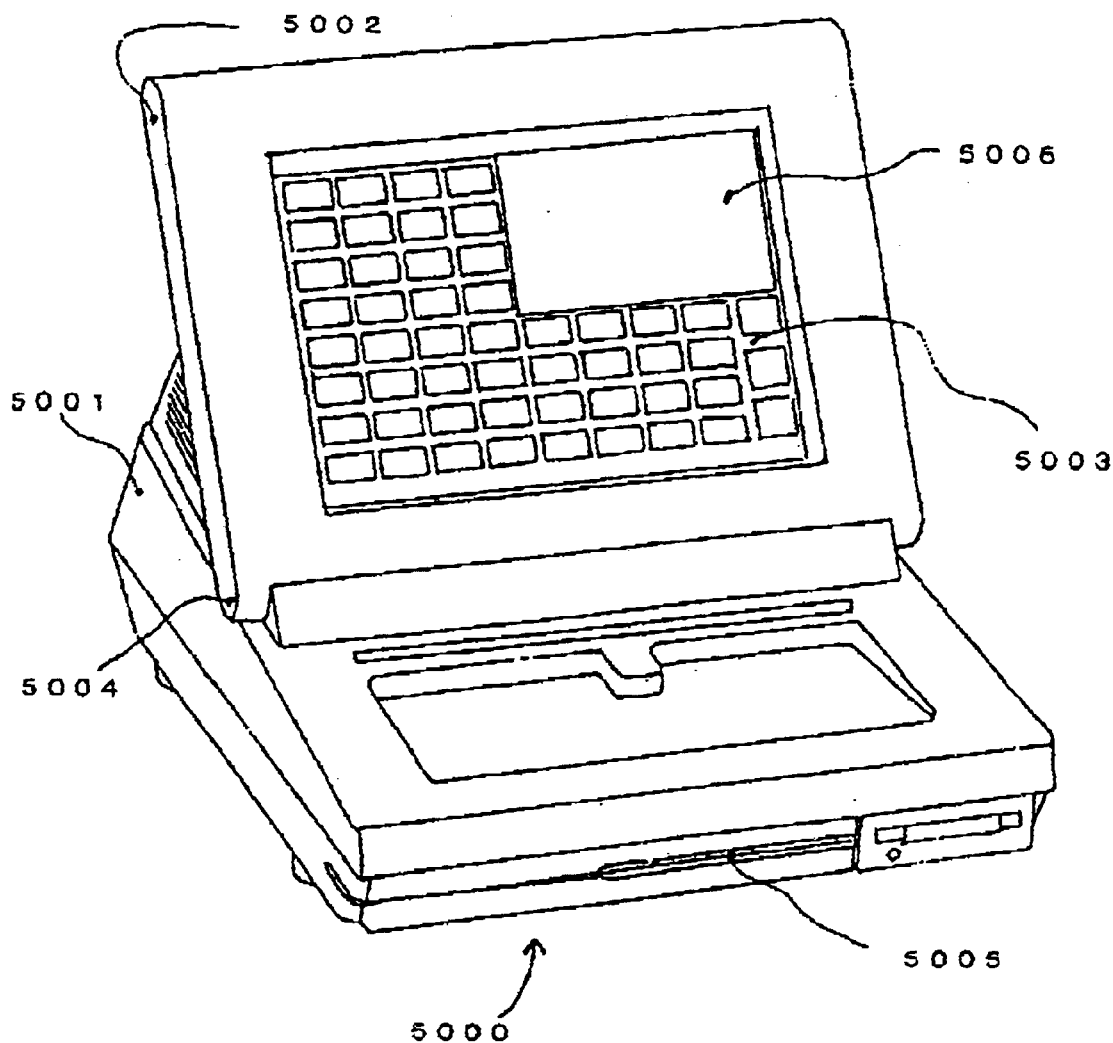
FIG. 53 is a perspective view showing a conventional sales transaction terminal device.

FIGS. 52A and 52B show a sales transaction terminal device in accordance with a thirty-second embodiment of the present invention. The sales transaction terminal device of the thirty-second embodiment is characterized in that an LCD (i.e., a liquid crystal display) unit 3404 is provided in the exhibition casing space.

An exhibition casing space 3400 is provided at the customer side of an L-shaped terminal body 3408. A customer display unit 3409 is provided at the front end of the customer side of the L-shaped terminal body 3408 which is closer to customers. A top body 3401 is provided on the L-shaped terminal body 3408, and is rotatably supported about a hinge member 3403 provided at the upper portion of the customer side of the L-shaped terminal body 3408. An operator display unit 3407 is rotatably supported at the operator side of the L-shaped terminal body 3408.

The customer display unit 3409 extends upward beyond an upper surface of a horizontally extending portion of the L-shaped terminal body 3408.

The top body 3401 is swingable between a closed position and an opened position.

When the top body 3401 is in the closed position, the top body 3401 and the customer display unit 3409 cooperatively hold a transparent cover casing 3405 placed in the exhibition casing space 3400.

When the top body 3401 is in the opened condition, the thirty-second embodiment allows an operator to remove the cover casing 3405 at the customer side.

In the cover casing 3405, the LCD unit 3404 is placed behind an exhibition object 3406. Needless to say that the LCD unit 3404 is placeable in front of the exhibition object 3406.

The top body 3401 conceals (or accommodates) a connectors 3402 necessary for electric power supply to the LCD unit 3404.

The LCD unit 3404 can be used to display color video or images to enhance the effects of advertisement, or to provide a stationary image display (e.g., background or foreground image).

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A sales transaction terminal device comprising:

a terminal body having a customer side and an operator side with a recessed configuration when seen from its side, said terminal body having an exhibition spot opened to said customer side, with a side view of said exhibition spot corresponding to said recessed configuration, and an operator display unit attached to said operator side of said terminal body for allowing an operator to perform a sales transaction when a customer places an order wherein said operator display unit and said exhibition spot are disposed in a back-to-back relationship to each other, and said terminal body is placeable on a shop counter where said sales transaction is performed.

2. The sales transaction terminal device in accordance with claim 1, wherein said operator display unit is rotatably hinged about a shaft provided at an upper part of the operator side of said terminal body so that an angle of said operator display unit is adjustable.

3. The sales transaction terminal device in accordance with claim 1, wherein a cover casing is provided to cover said exhibition spot, and said cover casing is transparent at a portion facing the customer.

4. The sales transaction terminal device in accordance with claim 1, wherein said terminal body is an L-shaped terminal body comprising a plurality of casings which cooperatively surround a frame body on which a circuit board is installable, and said operator display unit is rotatably provided at the operator side of said terminal body.

5. The sales transaction terminal device in accordance with claim 1, wherein a media card reader is provided at the operator side of said terminal body at a portion where said media card reader does not interfere with said operator display unit.

6. The sales transaction terminal device in accordance with claim 5, wherein said media card reader is slidable in a back-and-forth direction in response to an angular adjustment of said operator display unit.

7. The sales transaction terminal device in accordance with claim 5, wherein said media card reader is equipped with a wireless communication device so that the position of said media card reader can be flexibly changeable.

8. The sales transaction terminal device in accordance with claim 1, further comprising a customer display unit provided at the customer side of said terminal body opposed to said operator side.

9. The sales transaction terminal device in accordance with claim 8, wherein said customer display unit has a display screen extending beyond a table of said exhibition spot.

10. The sales transaction terminal device in accordance with claim 8, wherein said customer display unit is equipped with a data input device for allowing customers to select or enter their orders by themselves.

11. The sales transaction terminal device in accordance with claim 8, wherein said customer display unit is detachable from said terminal body.

12. The sales transaction terminal device in accordance with claim 8, wherein an angle of said customer display unit is adjustable.

13. The sales transaction terminal device in accordance with claim 8, wherein said customer display unit is exchangeable so that the size of said customer display unit is flexibly selectable from a plurality of types.

14. The sales transaction terminal device in accordance with claim 8, wherein a slide mechanism is provided to adjust a vertical position of said customer display unit.

15. The sales transaction terminal device in accordance with claim 8, wherein a universal joint linkage is used to connect said customer display unit to said terminal body.

16. The sales transaction terminal device in accordance with claim 8, wherein an arm linkage coupled by a plurality of elastic friction rings is interposed between said customer display unit and said terminal body.

17. The sales transaction terminal device in accordance with claim 1, wherein said terminal body has an exhibition casing space opened to the customer side thereof, with a side view of said exhibition casing space corresponding to said recessed configuration.

18. A sales transaction terminal device comprising:
   a terminal body having a recessed configuration when seen from its side, said terminal body having an exhibition spot opened to a customer side thereof, with a side view of said exhibition spot corresponding to said recessed configuration, and
   an operator display unit provided at an operator side of said terminal body for allowing an operator to perform a sales transaction when a customer places an order at a shop counter where said sales transaction terminal device is placed, wherein
   said terminal body is an L-shaped terminal body comprising a horizontal portion and a vertical portion which cooperatively constitute an L-shaped configuration, said horizontal portion having a top surface serving as a commodity table and said vertical portion having a wall cooperating with said top surface of said horizontal portion to form said exhibition spot,
   said vertical portion is rotatable about a shaft of a hinge provided at a corner of said horizontal portion and said vertical portion,
   a lock member is provided for fixing said vertical portion to said horizontal portion so that said vertical portion is held in a standing position, and
   said vertical portion is foldable about said shaft of said hinge and lies on said horizontal portion when said lock member is unlocked.

19. A sales transaction terminal device comprising:
   a terminal body having a recessed configuration when seen from its side, said terminal body having an exhibition spot opened to a customer side thereof, with a side view of said exhibition spot corresponding to said recessed configuration, and
   an operator display unit provided at an operator side of said terminal body for allowing, an operator to perform a sales transaction when a customer places an order at a shop counter where said sales transaction terminal device is placed, wherein
   said terminal body is an L-shaped terminal body comprising a horizontal portion and a vertical portion which cooperatively constitute an L-shaped configuration, said horizontal portion having a top surface serving as a commodity table and said vertical portion having a wall cooperating with said top surface of said horizontal portion to form said exhibition spot, and
   said vertical portion is detachable from said horizontal portion so as to be hung on a wall.

20. A sales transaction terminal device comprising:
   a terminal body having a recessed configuration when seen from its side, said terminal body having an exhibition spot opened to a customer side thereof, with a side view of said exhibition spot corresponding to said recessed configuration, and
   an operator display unit provided at an operator side of said terminal body for allowing an operator to perform a sales transaction when a customer places an order at a shop counter where said sales transaction terminal device is placed, wherein
   said terminal body is an L-shaped terminal body comprising a platelike horizontal portion and a vertical portion which cooperatively constitute an L-shaped configuration, said platelike horizontal portion having a top surface serving as a commodity table and said vertical portion having a wall cooperating with said top surface of said platelike horizontal portion to form said exhibition spot,
   said platelike horizontal portion is foldable about a hinge member provided between said horizontal portion and said vertical portion, so that said sales transaction terminal device can be used in a first position where said platelike horizontal portion is unfolded about said hinge member to place said sales transaction terminal device on a horizontal surface with said vertical portion being held at a standing position, and
   can be used in a second position where said platelike horizontal portion is folded about said hinge member to hang said sales transaction terminal device on a wall.

21. A sales transaction terminal device comprising:
   a terminal body having a recessed configuration when seen from its side, said terminal body having an exhibition spot opened to a customer side thereof, with a side view of said exhibition spot corresponding to said recessed configuration, and
   an operator display unit provided at an operator side of said terminal body for allowing an operator to perform a sales transaction when a customer places an order at a shop counter where said sales transaction terminal device is placed, wherein
   said terminal body is an L-shaped terminal body comprising a standing portion supporting said operator display unit and a base portion supporting said standing portion so as to form at least part of said exhibition spot of said terminal body.

22. A sales transaction terminal device comprising:
   a terminal body having a recessed configuration when seen from its side, said terminal body having an exhibition spot opened to a customer side thereof, with a side view of said exhibition spot corresponding to said recessed configuration, and
   an operator display unit provided at an operator side of said terminal body for allowing an operator to perform a sales transaction when a customer places an order at a shop counter where said sales transaction terminal device is placed, wherein
   a roof is provided on a top of said terminal body.

23. A sales transaction terminal device comprising:
   a terminal body having a recessed configuration when seen from its side, said terminal body having an exhibition spot opened to a customer side thereof, with a side view of said exhibition spot corresponding to said recessed configuration, and
   an operator display unit provided at an operator side of said terminal body for allowing an operator to perform a sales transaction when a customer places an order at a shop counter where said sales transaction terminal device is placed, wherein said terminal body has a lying U-shaped configuration when seen from its side, said terminal body having an exhibition spot opened to a customer side thereof, with a side view of said exhibition spot corresponding to said lying U-shaped configuration, and said operator display unit is provided at an operator side of said lying U-shaped terminal body for allowing an operator to perform a sales transaction when a customer places an order at a shop counter where said sales transaction terminal device is placed.

24. A sales transaction terminal device comprising:

a terminal body having a recessed configuration when seen from its side, said terminal body having an exhibition spot opened to a customer side thereof, with a side view of said exhibition spot corresponding to said recessed configuration, and an operator display unit provided at an operator side of said terminal body for allowing an operator to perform a sales transaction when a customer places an order at a shop counter where said sales transaction terminal device is placed, wherein said terminal body has an exhibition casing space opened to the customer side thereof, with a side view of said exhibition casing space corresponding to said recessed configuration, a customer display unit is provided at the customer side of said terminal body opposed to said operator side, and said customer display unit extends upward beyond an upper surface of a horizontally extending portion of said terminal body to hold a cover casing in said exhibition casing space while allowing said cover casing to slide in a direction normal to the customer side.

25. The sales transaction terminal device in accordance with claim 24, wherein said cover casing is an elastically deformable casing having a projection, and a recess engageable with said projection of said cover casing is formed on a surface of said terminal body, so that said projection and said recess cooperatively form a slide-in and click-stop mechanism for said cover casing.

26. A sales transaction terminal device comprising:

a terminal body having a recessed configuration when seen from its side, said terminal body having an exhibition spot opened to a customer side thereof, with a side view of said exhibition spot corresponding to said recessed configuration, and an operator display unit provided at an operator side of said terminal body for allowing an operator to perform a sales transaction when a customer body for places an order at a shop counter where said sales transaction terminal device is placed, wherein said terminal body has an exhibition casing space opened to the customer side thereof, with a side view of said exhibition casing space corresponding to said recessed configuration, a customer display unit is provided at the customer side of said terminal body opposed to said operator side, said customer display unit extends upward beyond an upper surface of a horizontally extending portion of said terminal body to hold a cover casing in said exhibition casing space, a bent portion is provided at each side of said customer display unit so as to serve as a stopper for preventing said cover casing from sliding, and said customer display unit is slidable in an up-and-down direction along a surface of said terminal body, so that said cover casing can be removed at said customer side.

27. A sales transaction terminal device comprising:

a terminal body having a recessed configuration when seen from its side, said terminal body having, an exhibition spot opened to a customer side thereof, with a side view of said exhibition spot corresponding to said recessed configuration, and an operator display unit provided at an operator side of said terminal body or allowing an operator to perform a sales transaction when a customer body for places an order at a shop counter where said sales transaction terminal device is placed, wherein said terminal body has an exhibition casing space opened to the customer side thereof, with a side view of said exhibition casing space corresponding to said recessed configuration, a customer display unit is provided at the customer side of said terminal body opposed to said operator side, said customer display unit extends upward beyond an upper surface of a horizontally extending portion of said terminal body to hold a lower end of an advertisement plate at a rear side of said customer display unit, and a protruding portion is provided on a top of said terminal body to hold an upper portion of said advertisement plate leaning at a predetermined angle.

28. A sales transaction terminal device comprising:

a terminal body having a recessed configuration when seen from its side, said terminal body having an exhibition spot opened to a customer side thereof, with a side view of said exhibition spot corresponding to said recessed configuration, and an operator display unit provided at an operator side of said terminal body for allowing an operator to perform a sales transaction when a customer places an order at a shop counter where said sales transaction terminal device is placed, wherein said terminal body has an exhibition casing space opened to the customer side thereof, with a side view of said exhibition casing space corresponding to said recessed configuration, a cover casing is placed in said exhibition casing space, a protruding portion is formed at an upper end of said cover casing to hold an advertisement plate between said protruding portion and a top body provided on said terminal body, and said top body has an inclined surface for receiving said advertisement plate.

29. A sales transaction terminal device comprising:

a terminal body having a recessed configuration when seen from its side, said terminal body having an exhibition spot opened to a customer side thereof, with a side view of said exhibition spot corresponding, to said recessed configuration, and an operator display unit provided at an operator side of said terminal body for allowing an operator to perform a sales transaction when a customer places an order at a shop counter where said sales transaction terminal device is placed, wherein a small camera is provided on a predetermined position at the operator side of said terminal body so that said small camera can take a photo of an operator, and a printer is provided to produce a photo of the operator printed on a receipt or a note produced as a result of the sales transaction.

30. A sales transaction terminal device comprising:

a terminal body having a recessed configuration when seen from its side, said terminal body having an exhibition spot opened to a customer side thereof with a side view of said exhibition spot corresponding to said recessed configuration, and an operator display unit provided at an operator side of said terminal body for allowing an operator to perform a sales transaction when a customer places an order at a shop counter where said sales transaction terminal device is placed, wherein a small camera is provided on a predetermined position at the customer side of said terminal body so that said small camera can take a photo of a customer, and a printer is provided to produce a photo of the customer printed on a receipt or a note produced as a result of the sales transaction.

31. The sales transaction terminal device in accordance with claim 30, wherein said small camera is operable by a foot switch provided in a foot area of the operator.

32. The sales transaction terminal device in accordance with claim 30, wherein said small camera is operable by a touch switch attached to an article worn by the operator.

33. A sales transaction terminal device comprising:

a terminal body having a recessed configuration when seen from its side, said terminal body having an exhibition spot opened to a customer side thereof, with a side view of said exhibition spot corresponding to said recessed configuration, and an operator display unit provided at an operator side of said terminal body for allowing an operator to perform a sales transaction when a customer places an order at a shop counter where said sales transaction terminal device is placed, wherein said terminal body has an exhibition casing space opened to the customer side thereof, with a side view of said exhibition casing space corresponding to said recessed configuration, a customer display unit is provided at the customer side of said terminal body opposed to said operator side, said customer display unit extends upward beyond an upper surface of a horizontally extending portion of said terminal body to hold a cover casing in said exhibition casing space, and a top body is supported on an upper portion of said terminal body and is rotatable between a closed position and an opened position, so that said cover casing is held by said top body and said customer display unit in said closed condition while said cover casing is removable from said exhibition casing space in said opened condition.

34. The sales transaction terminal device in accordance with claim 33, wherein said top body conceals electric parts necessary for electric power supply to an exhibition object in said cover casing.

35. The sales transaction terminal device in accordance with claim 33, wherein an electric display unit is accommodated in said cover casing.

* * * * *

UNITED STATES PATENT AND TRADEMARK OFFICE
CERTIFICATE OF CORRECTION

PATENT NO. : 6,629,636 B1
DATED : October 7, 2003
INVENTOR(S) : Kiyotsugu Hayashi et al.

It is certified that error appears in the above-identified patent and that said Letters Patent is hereby corrected as shown below:

<u>Title page,</u>
Item [75], Inventors, please insert -- Osamu Yonekawa, Yokohama (JP) --.

Signed and Sealed this

Seventeenth Day of February, 2004

JON W. DUDAS
*Acting Director of the United States Patent and Trademark Office*